US010917521B1

(12) United States Patent
Koster et al.

(10) Patent No.: US 10,917,521 B1
(45) Date of Patent: *Feb. 9, 2021

(54) HANDLING A CALLBACK CALL IN A CONTACT CENTER IN RESPONSE TO A LIMITED-CONTENT MESSAGE

(71) Applicant: Noble Systems Corporation, Atlanta, GA (US)

(72) Inventors: Karl H. Koster, Sandy Springs, GA (US); Guilherme A Miranda Villarinho, Johns Creek, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,059

(22) Filed: Jul. 17, 2020

Related U.S. Application Data

(63) Continuation-in-part of application No. 16/744,700, filed on Jan. 16, 2020, now Pat. No. 10,750,021, which is a continuation-in-part of application No. 16/522,941, filed on Jul. 26, 2019, now Pat. No. 10,742,795.

(60) Provisional application No. 62/870,708, filed on Jul. 4, 2019.

(51) Int. Cl.
*H04M 3/436* (2006.01)
*H04M 3/51* (2006.01)
*H04M 3/523* (2006.01)
*H04M 1/725* (2006.01)

(52) U.S. Cl.
CPC ..... *H04M 3/4365* (2013.01); *H04M 1/72552* (2013.01); *H04M 1/72569* (2013.01); *H04M 3/5191* (2013.01); *H04M 3/5231* (2013.01)

(58) Field of Classification Search
CPC .......... H04M 3/4365; H04M 1/72569; H04M 3/5191; H04M 1/72552; H04M 3/5231
See application file for complete search history.

(56) References Cited

U.S. PATENT DOCUMENTS

| 8,781,092 B2* | 7/2014 | Noble, Jr. | ........... H04M 3/5231 379/210.01 |
| 9,426,294 B1* | 8/2016 | Lillard | ................ H04M 3/5231 |
| 9,848,082 B1* | 12/2017 | Lillard | ................ H04M 3/5231 |
| 2010/0284522 A1* | 11/2010 | Jaiswal | .................. H04M 3/493 379/88.04 |
| 2012/0027194 A1* | 2/2012 | Deshpande | ........... H04M 3/493 379/265.01 |

(Continued)

*Primary Examiner* — Julio R Perez

(57) ABSTRACT

A system for sending limited-content message texts to a debtor, where each message comprises a fixed format, comprising an agent's name, which may be an alias, a callback number, and optional suggested times for the recipient to callback the agent. The limited content message texts are sent over a time period during the work schedule of the agent. Upon receiving a voice telephone callback from the recipient, a comparison is performed on the calling party number to ascertain if it matches a called party number of one of the sent limited-content message texts. If matched, then the call is routed to the agent identified in the limited-content message text. If the agent is unavailable, various options for routing the call is identified. The agent is further presented with information indicating the voice telephone call is a callback in response to a previously sent limited-content message text.

20 Claims, 20 Drawing Sheets

(56) References Cited

U.S. PATENT DOCUMENTS

2016/0065739 A1* 3/2016 Brimshan ........... H04M 3/5231
379/88.01

* cited by examiner

HANDLING A CALLBACK CALL IN A CONTACT CENTER IN RESPONSE TO A LIMITED-CONTENT MESSAGE

RELATED APPLICATIONS

This application is a continuation-in-part of U.S. patent application Ser. No. 16/744,700, filed on Jan. 16, 2020, which in turn is a continuation-in-part of U.S. patent application Ser. No. 16/522,941, filed on Jul. 26, 2019, which in turn claims priority to U.S. Provisional Patent Application 62/870,708, filed on Jul. 4, 2019, the contents of all of which are incorporated by reference.

BACKGROUND

Debt-collection is a highly regulated process and is frequently communication intensive. Debt collectors may need to communicate with a debtor regarding the debt, which may be time-sensitive. The failure to conduct a communication, such as reminding the debtor to make a payment, may result in various undesirable outcomes, such as the debtor defaulting on the debt and/or initiating a judicial process to recover the debt. Complicating the overall process is that many debtors frequently do not like to speak with debt collectors and will avoid contact. Further complicating the overall process is that debt collectors may be limited in the number of voice telephone call attempts over a time period that can be made to the debtor.

The advent and popularity of new communication technologies, such as short message service ("SMS") texting is an effective way to communicate to various people. It is reported that younger people are more attuned to communicating via text as opposed to accepting voice telephone calls. Thus, texting can be used for conveying certain information to a debtor. This can include providing information regarding the status of a loan or a credit account to the debtor. However, for third-party debt collectors, i.e., those collecting the debt on behalf of another, using such new technologies can be fraught with risks of violating other regulations, related to disclosure of the debt to a third party.

However, new regulations are being developed which would allow debt collector to initiate a limited-content ("LC") message with a lower level of risk. The generation of LC SMS text messages could prove highly effective and low cost in aiding a debtor to be reminded and kept up-to-date regarding the status of their account. However, additional complexities may be introduced, and effective use of technology is required in order to fully utilize the potential efficiencies that may be realized with these newer regulations. For example, upon inviting a debtor to initiate a call back to the debt collector that the debt collector must be able to quickly ascertain the incoming call is responsive to the previously sent LC-text message, and must be able to route it to the appropriate agent. Currently, effective methods for performing this route selection are not available. The call handler should route an incoming call to a particular agent, if that call was initiated in response to a text asking the debtor to call back and speak to a particular agent. However, call handlers are frequently configured to route the call to any available agent in a group and are not configured to route the call based on an agent identified in a prior text message sent to the caller. Routing the call to another agent may confuse the debtor and require additional time by the agent to explain the circumstances as to why the expected agent was not connected to the caller.

Therefore, what is needed is technology to effectively process LC-text messages for a contact center, so as to maximize the effective of such communications. Further, when the debtor receives the LC message and does initiate a return call ("callback") to the debt collection, the debt collector should be aware that the debtor is doing so in response to receiving the LC message text, and route the call to the agent identified in the LC-text message.

BRIEF SUMMARY

Technologies are generally presented herein that pertain to processing of voice and text calls related to limited-content messages sent in a debt collection context. This involves appropriately processing outbound LC-text messages for an agent and efficiently processing the inbound voice callback calls initiated by the debtor in response to receiving the outbound LC-text message.

The subject matter disclosed herein may be implemented as a computer-controlled apparatus, a computer process, a computing system, or as an article of manufacture such as a computer readable storage medium. These and various other features will be apparent from the following Detailed Description and the associated drawings.

This Summary is provided to exemplify concepts in a high-level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
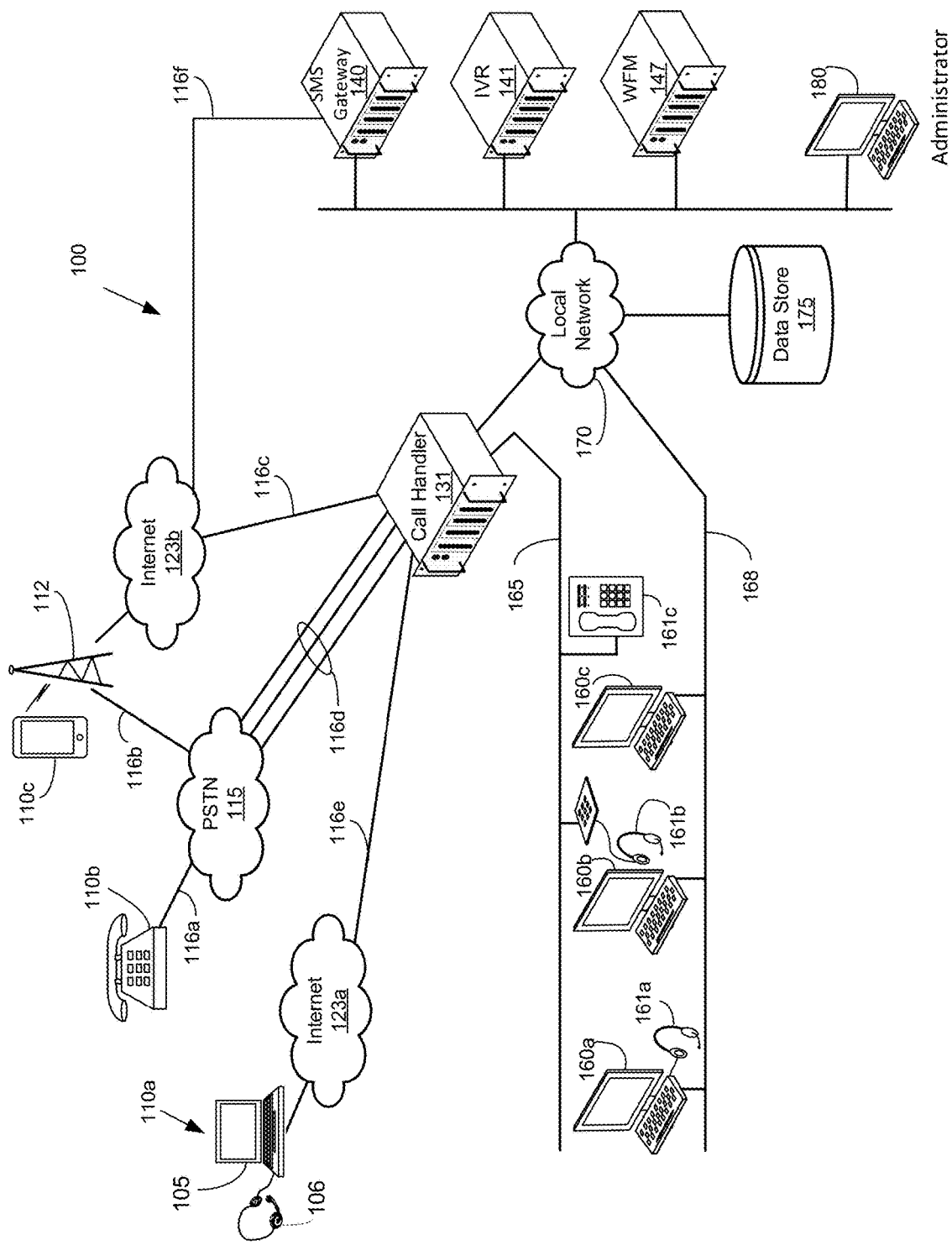
FIG. 1 illustrates one embodiment of a context for a contact center practicing the concepts and technologies disclosed herein for generating a limited-content message texts and handling the corresponding callback voice call.

Various embodiments for practicing the technologies disclosed herein are described more fully hereinafter with reference to the accompanying drawings, in which some, but not necessarily all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout. Embodiments of the invention may be utilized in various industries, as will become apparent to those of ordinary skill in the art as they read the disclosure. However, for purposes of this disclosure, applications involving contact centers are mainly used for illustrating various embodiments of the invention.

Limited-Content Messages

In the context herein, a "limited-content message text" (a.k.a. "limited-content text message" or "LC-text") refers to a SMS text message that is sent by a contact center operated by a debt-collector, where the message is sent to a consumer, i.e., a debtor. The limited-content text message includes the following content: the consumer's name, a request that the consumer reply to the message by initiating a callback call, the name or names of one or more natural persons who the consumer can contact to reply to the debt collector, a telephone number that the consumer can use to reply (initiated the callback call) to the debt collector, and one or more ways the consumer can opt out of further electronic communications by the debt collector to that telephone number. In addition, certain information may be optionally included in the limited-content message, namely: a salutation, the date and time of the message, a generic statement that the message relates to an account, and suggested dates and times for the consumer to reply to the message.

The name of the person who the consumer can contact to reply to is presumed to be an agent employed by the contact center that sent the limited-content message text. Hence, the name is that of the identified agent. For various reasons, it is permissible to use an alias for the agent. Specifically, the agent's real name may not be disclosed, but an assigned, fictional name correlating to that agent may be indicated. If an alias is used, it must be consistently used, and must not interfere with the ability of the debt collector to identify the true identity of that particular agent. Thus, it is not acceptable for a limited-content message to inform the debtor that they should reply back to "John" or "John Smith" wherein any agent can be identified as such in the contact center. Rather, there should be a one-to-one correspondence from the alias to a given agent. This may require mapping the alias name to an actual agent when the callback call is received.

Exemplary Contact Center Context

The context of how an award campaign management system may be deployed in a contact center is shown in FIG. 1. FIG. 1 shows one embodiment of a contact center architecture 100 illustrating the various technologies disclosed herein. The contact center shown in FIG. 1 may process voice calls that are inbound-only, outbound-only, or a combination of both (sometimes referred to as a "blended" contact center). Thus, in some instances, the contact center may be referred to as a call center when referring primarily to the context of handling calls. Although many aspects of contact center operation are disclosed in the context of voice calls, in various embodiments, the contact center may process other forms of communication such as, for example, facsimiles, emails, text messages, video calls, and chat messages. In many regulatory contexts, a "call" encompasses a voice call or text message.

Since the contact center may handle calls originating from a calling party, or initiated to a called party, the term "party" or "remote party" without any further qualification, refers to a person associated with a call processed by the contact center, where the call is either received from or placed to the party. The term "caller," if used, will generally refer to a party communicating with the contact center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route voice calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology. Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a headset 106. The computing device 105 may in turn be connected to an Internet 123a. Those skilled in the art will recognize that a variety of protocols and facilities may be used to convey voice calls.

In various embodiments, inbound calls from callers to the contact center may be received at a communications handler, and more specifically a call handler 131, which is a computer-based processing system configured to process voice calls, such as SIP (session initiated protocol), VoIP (voice over Internet Protocol), or TDMA (time division multiplex access) technology-based voice calls. The call handler could be, e.g., an automatic call distributor ("ACD"). In particular embodiments, the call handler 131 may be a specialized switch for receiving and routing inbound calls under various conditions. The call handler 131 may route an incoming call over contact center facilities 165 to an available agent. Depending on the embodiment, the facilities 165 may be any suitable technology for conveying the call, including but not limited to a local area network ("LAN"), wide area network ("WAN"), ISDN, or conventional TDMA circuits. In addition, the facilities 165 may be the same or different from the facilities used to transport the call to the call handler 131. If the call handler is a communications handler, then it can handle various types of communications, such as voice and non-voice communications. In some embodiments, the communications handler will be able to originate and receive text (SMS) calls, and this negates the need for a separate SMS gateway 140.

In various embodiments, calls may be routed over facilities 165 to an agent for servicing. That is, for example, the party may speak with an agent to receive customer service. An agent typically uses a computing device 160a-160c, such as a personal computer, and a voice device 161a-161c. The combination of computing device 160a-160c and voice device 161a-161c may be referred to as a "workstation." In many instances, the computing device handles VoIP so that reference to the "computer workstation" or the "agent's computer" refers to the computer processing device of the workstation, but which may be closely integrated with handling voice as well. Thus, for these particular embodiments, the workstation can be assumed to have at least a data capability and may have a voice capability. Depending on the embodiment, the interaction between the call handler 131 and the agent workstation computers 160a-160c, as well as other components, may involve using a local area network ("LAN") 170.

In addition to receiving inbound communications, including, for example, voice calls, emails, text messages, and facsimiles, the contact center may also originate communications to a called party, referred to herein as "outbound" communications. In some embodiments, the call handler 131 may comprise a dialer, such as a predictive dialer, to originate outbound calls at a rate designed to meet various criteria. In various embodiments, the call handler 131 is typically configured to dial a list of telephone numbers to initiate outbound calls. Data for the calls may be stored in a data store 175.

The contact center architecture 100 may include a Short Message Server ("SMS") texting gateway 140. This allows text messages to be sent to a wireless number using facilities 116f that is connected to an internet service provider. In other embodiments, the SMS gateway may be integrated into the call handler 131 or the call handler may be a communications handler capable of handling various channel types, including text. An administrator using the administrator workstation 180 may interact with the various components to configure them as necessary.

The contact center may also incorporate an interactive voice response ("IVR") 141. The IVR may receive incoming calls and play an announcement or otherwise prompt the caller, as well as potentially interacting with the caller via accepting DTMF or speech input. In other embodiments, the IVR may be integrated into the call handler 131. Although the IVR is shown connected to a LAN 170, and may receive calls routed by the call handler, in other embodiments, the IVR may directly receive calls via facilities 116d, 116c, or 116e.

The contact center may also incorporate a workforce management ("WFM") system 147. The WFM manages the schedule information for the agents, so that information is required to ascertain when a particular agent is working, the WFM maintains that information, and can provide that in response to a query.

Although a number of the above entities may be referred to as a "component" or "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located/integrated with) other components. Furthermore, one or more of the components may be implemented on a single processing device to perform the functions described herein. In addition, the contact center architecture 100 may be provided as a hosted solution, where the call processing functionality is provided as a communication service (a so-called "communication-as-a-service" or "CaaS") to a contact center operator. Thus, there is no requirement that the components identified above must be actually physically located in a contact center location or controlled by a contact center operator. In addition, depending on the embodiment, the agent positions may be remotely located from the other components of the contact center, sometimes referred to as a "virtual contact center." Those skilled in art will recognize FIG. 1 represents one possible configuration of a contact center architecture 100, and variations are possible with respect to the protocols, facilities, components, technologies, and equipment used.

Overview

The communication from the contact center operated by a debt collector is based on sending a limited-content ("LC") message text to a debtor, which is intended to cause the debtor to call back the contact center via a telephone call. This return telephone call is referred to as a "callback call" or simply "callback" because it is made in response to receiving the limited-content message text. The limited-content message text is intended to allow the debt collector to request the debtor to callback to receive information regarding the debt without disclosing to a third party that the consumer has a debt. Hence, the limited-content message text is carefully regulated to include specific mandated and optional content. The limited-content message is further explained in proposed regulations promulgated by the Consumer Financial Protection Bureau ("CFPB") and in the prior related applications referenced previously. Those skilled in the art of debt collection will be familiar with the concept of a "limited-content message" as specified by the CFPB as of the time of the filing of this specification. As used herein, the LC message text is a text message that is structured as a limited-content message, which has defined content, comprising mandatory information and certain optional information. The LC messages can be sent as voice messages, text messages, and potentially as other forms. Thus, there can be a LC message voice message that is left on an answering machine or a LC message text sent.

At a high level the concept of the LC message is straightforward. A LC message may be sent to spur the debtor to initiate a callback to the contact center. However, in other respects, the communication is complicated in that the LC message text must identify an agent by name and may optionally indicate a suggested callback time. Further, when the debtor calls back, they will expect, or may request, to speak with the agent associated with the indicated name. It is unusual to send out a text to request the recipient to respond using another channel, let alone naming an individual the recipient should contact. This necessitates processing the callback voice call to ascertain the particular agent that was previously identified in the text sent to that called party. Frequently, the number indicated to and dialed by the called party will not identify the particular agent indicated in the LC message. That is, a single telephone number could be used in all the LC messages, and when a callback call is received, further processing is required to determine what agent the caller should be connected to. One approach is to answer the callback call and ask the caller which agent they wish to speak with. Another approach is to use the calling party telephone number to ascertain the LC-text message sent, and the agent(s) identified therein.

Further, the nature of texting communication can add further complications. First of all, it is well known that texting communication has certain characteristics, namely that the recipient will typically review the text within a short time after receipt. In some studies, the recipient will typically read the text within three minutes of receipt. Second, a text recipient will frequently reply sooner to a text, if at all, as compared to responding to a received voicemail or email. There is a sense of real-time urgency associated with responding to a text as opposed to responding to a voicemail or email. Thus, the recipient is likely to respond to the text, if at all, within a few hours of receipt. In many cases, the recipient will respond to the text within a much shorter time, e.g., within an hour or few minutes. Finally, many younger people (i.e., those sometimes referred to as "millennials") will simply favor communication via text, as opposed to answering a call.

Assume then the recipient receives a text requesting them to call a named agent (for purposes of illustration, the name "John Smith" for the agent will be used) within a suggested time period. It is not unexpected that the recipient will call back within that time period and will expect/desire to speak with the name agent, i.e., John Smith. While it would seem obvious that the corresponding agent, John Smith, should be available, that presumes that the text was sent out when John Smith was working (or about to start working) and also indicated a suggested callback time when John Smith was working. This means that the LC message text should be sent out at a time, including the optional callback times, taking into consideration the work schedule of the name agent. In other words, the contents of the LC message text (i.e., the suggested callback times) depends on the work schedule of the named agent in the LC message.

There is another concern as to when the LC message is sent out to the recipient that names a particular agent: How many limited-content messages should be sent out that all refer to the same agent? If John Smith regularly handles conventional incoming voice calls (i.e., non-callback calls), then John Smith may be able to handle a certain number of additional voice callback calls. However, sending 10,000 limited-content messages to 10,000 debtors inviting them to all call back John Smith during the same time period is sure to overwhelm John Smith with callback calls and result in many such calls being placed on hold or queued. Thus, metering the number and rate of the LC message texts for an identified agent is critical, and the process needs to consider the workflow and capacity of the particular agent identified. If the named indicated in the LC message were an alias that all agents used, i.e., the name could correspond to any agent working when the callback call is received, then this may not be as a great of a concern. However, the process disclosed herein presumes that the alias used must correspond to a particular agent. Thus, the name indicated cannot simply refer to any working agent at that moment. The name, however, can be an alias name corresponding to a particular agent.

While it seems obvious, when incoming call from the recipient is received at the indicated number, the means must exist to ensure that the call is ultimately routed to the agent corresponding to John Smith. Further, John Smith should be aware that this voice telephone call being presented is a callback call received in response to the limited-content text. This can complicate operation of the contact center, since tracking an alias name of an agent is frequently not done.

Thus, while sending the limited-content message text itself is relatively straightforward for the contact center, ascertaining when each should be sent, how many LC message texts should be sent, and ascertaining the contents of the LC message text is not straightforward.

Outbound Generation of Limited-Content Message Texts

Option 1

An agent working a full shift during the day (e.g., eight hours) will have a certain finite capacity to handle incoming callback calls. The exact number will vary by agent, since many agents will also be performing other duties, such as answering non-callback calls, handling other outbound voice calls, etc. For example, if each call required 5 minutes to handle, then an agent could theoretically handle up to 12 calls per hour. For practical reasons (such as considering necessary after-call-work time after the completion of a call), that number may be lower. However, whatever that number is, the agent will be unable to handle all such calls at once. Obviously, while on a present call, the agent cannot handle other callback calls, so it is desirable that such callback calls are spread out during the agent's shift. This suggests that the LC messages should be sent out throughout the agent's shift so that the resulting callbacks also are received throughout the agent's shift. Further, it would be desirable that when debtors do call back, their callback calls are handled at that time, and not queued. If all such calls occurred at the same time, then all but one call would be queued. No doubt some of those callers waiting would abandon their calls, which frustrates the entire purpose of encouraging debtors to call back.

Figure 2A:
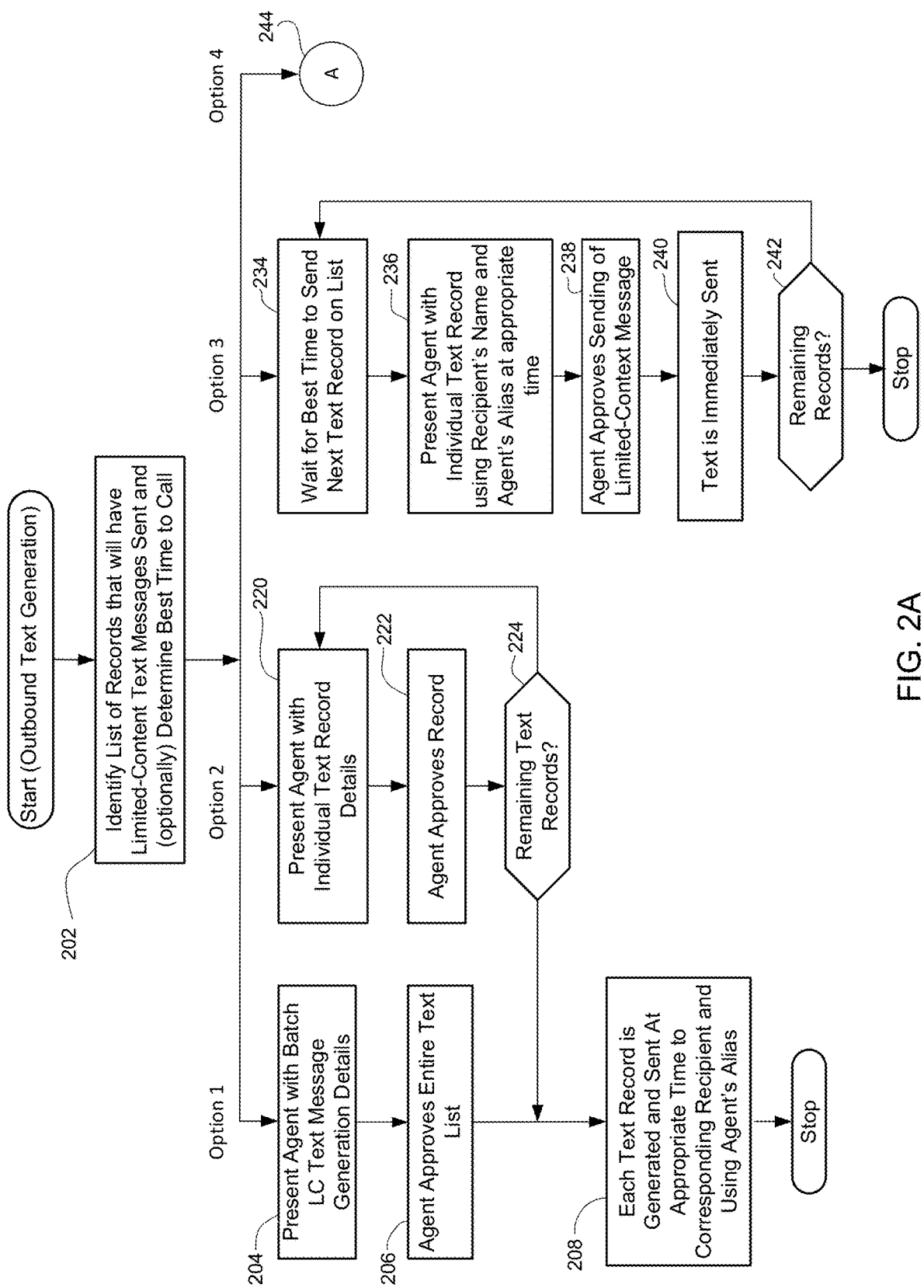
FIGS. 2A-2B illustrate various embodiments of process flows for generating outbound limited-content text messages.

FIG. 2A discloses various embodiments of how an agent can be presented with a list of accounts indicated by records in the list for causing limited-content texts to be sent out. For purposed herein, a list is considered to be a logical collection of records. Each record typically is associated with an account, which could be information pertaining to one or more debts associated with the debtor. Each account will be associated with a debtor, i.e., the person owing the money. There is presumed to be a one-to-one association between the account, the debtor, the telephone number of the debtor, and the record. Thus, knowing the contents of a particular record means that the debtor's name, contact information, address, and other information is readily known (or can be readily determined from the record).

The process begins first in operation 202 with identifying a list of records for which outbound LC message texts are to be sent. In one embodiment, this may be a list of records that have been identified for being sent on behalf for a particular agent, or it may comprise records for a group of agents. If the list is for a specific agent, then that list represents the number of messages that would be generated for that agent. If the list for a group of agents, then that list will be later segregated and allocated in some manner to the agents in the group during the processing. In one embodiment, the list of records is merely identified as those accounts who are to receive some form of reminder LC message text that day on behalf of agents working their shift on that day. Thus, this processing (i.e., identifying the list of records for each agent) may occur early morning before the agents begin their shifts. Sending the LC message text on behalf of the agents means that the LC messages are sent identifying that agent.

The first option (Option 1) typically occurs early when each agent begins their shift. This option further presumes that a list of records has been identified for the particular agent. This may involve selecting a subset of records from a larger list. The agent is presented with information regarding the list of accounts or records which are to receive the LC message text. The format of the text message is largely limited and fixed in content to conform with regulations and internal policies. Thus, the agent will rapidly learn that these messages "look" similar in content and form. For example, the format will typically be the same except for the recipient's name, the agent's name (which for a particular agent is that agent's name or alias), and the optional suggested call back times. There may be even be an informal or alias name used to refer to such messages in the debt collection contact center environment. These LC message texts may be referred to as a "reminder text" or "callback text." The agent may be able to review the names of the accounts in the list, either in detail or in a cursory manner in operation 204, along with aspects of the form of the callback text that will be generated. More will be discussed later of the user interface that the agent may be presented with to review this information.

Next, in this embodiment, the agent approves of sending the entire set of LC message texts in operation 204. The agent may provide their approval via a single input, such as confirming the generation of all of the text messages. Other embodiments may allow the agent to review and approve individual records in the list. Thus, the agent could exclude specific accounts, if this capability is so desired. At this point, the agent's interaction with the generation of the LC messages is largely complete.

The system will then generate an appropriate text message to the recipient, i.e., the debtor associated with each account for each record in the list, at the appropriate time. The "appropriate text message" aspect refers to that the contents of the message is customized for each record. The limited-content message text must include that name of the recipient (debtor) and must also reflect that agent's actual name or alias. Further, to the extent the message includes suggested callback times, these times may be customized to reflect that agent's assigned work times.

The system may transmit each LC message at a time appropriate or optimal for that account. For example, it would be generally inappropriate to send text messages to accounts in a time zone such that the text is received before 8:00 a.m. or after 9:00 p.m. their local time. Further, it would be inappropriate to send an account a text at a time that the account has indicated is inappropriate or inconvenient. For example, the account may have previously indicated that they are involved with work activities between 5 a.m. and 3 p.m. and should not be contacted as these are inconvenient times. Or, that the account may have indicated that they are involved with day-care related activities each morning between 8 a.m. and 8:30 a.m. and 4:30-5:30 p.m. and should not be contacted at that time.

In other embodiments, the time at which the limited-content message text is transmitted is further determined by a best-time-to-call ("BTTC") algorithm. These algorithms are known to those skilled in the art, and may involve various factors to ascertain when (during a particular day) is a preferred time to send a text. The sending of the text could be predicated on an optimal time, including as disclosed in U.S. patent application Ser. No. 16/739,621, entitled "Pacing Limited-Content Text Messages", filed on Jan. 10, 2020, the contents of which are incorporated by reference for all that it teaches. For example, in one embodiment, the BTTC algorithm remembers that when a prior text was sent to this account at late afternoon, an immediate response (i.e., callback) was received. Thus, the BTTC algorithm may schedule sending out a subsequent text in late afternoon. Or, the BTTC algorithm may ascertain various characteristics of this account using other similarly situated accounts, and glean that the best time to send the text for this account is similar to when the best time occurred for the other similarly situated accounts.

Thus, Option 1 involves the agent reviewing and approving a list, which will be used to generate and transmit LC message texts automatically throughout the agent's shift. The agent can expect to receive callback call throughout their shift from the presently notified accounts, as well as potential callback calls from accounts notified the previous day. The agent approving the list may not necessarily have the ability to edit or individual modify the list by adding or subtracting records, whereas in some embodiments, the agents may have such ability. In other embodiments, the agents may have the ability to modify the suggested callback times to dovetail with their current work schedule. Finally, the approach shown in Option 1 can be also characterized by a single agent action (a form of human intervention) that indicates approval thereby causing LC messages to be sent to all the debtors indicated in entire list, as approved by the agent.

Option 2

The next option, Option 2, is similar to the above, except that the agent is presented with the opportunity in operation 220 to individually approve or decline each record in the list. This requires the agent to provide input for each record of the list, in the form of human intervention, thereby causing a corresponding limited-content message text to be generated. Further aspects on the agent's user interface to accomplish this will be presented later. This requirement of individualized human intervention is based on various judicial interpretations of the Telephone Consumer Protection Act, which have found that providing a level of human intervention required to initiate a call avoids the equipment being used as being classified an automatic telephone dialing system ("ATDS").

In this process flow, the agent is presented with each individual account or record for which a limited-content message text is to be subsequently generated. The agent must indicate an input for each record, such as selecting a function key, function icon, or providing a keyboard input, to indicate an affirmation of some sort thereby causing a corresponding limited-content message to be sent in operation 222. If there are remaining records to be processed in operation 224, then the process loops back to the next record in operation 220. Once all records have been considered, then the process continues to operation 208 where the records are transmitted as the appropriate time. Thus, the agent may individually approve all of the records in the list at the beginning of their shift, and the system may then send each LC message text at the optimal time during the agent's shift. The appropriate time when each LC message text is sent may involve using the various calling window and BTTC considerations discussed herein, or other algorithms.

In this approach, Option 2, the agent individually approves each of the records in the list allocated to that agent, and once all records are approved, the agent is largely done with interacting with the system for purposes of causing the limited-content messages to be generated. At this point, the agent may address the resulting callback calls during the remainder of their current shift, as well as potentially following their shift (if they are willing to extend their shift). The agent may also be receiving callback calls from previously sent LC messages (i.e., send during the agent's prior shift).

Option 3

The third option, Option 3, again presumes that a list of records has been identified for the agent to approve for transmission. However, whereas the prior approaches involved the agent approving the list at the beginning of their shift for subsequent generation/sending of the messages during their shirt, this approach involves the agent being presented with each record at the appropriate time during their shift to approve its immediate transmission. In other words, Options 1 and 2 involved the agent approving records for deferred transmission, whereas this option involves the agent approving records for immediate transmission.

The process begins in operation 234 with the system determining the best time to present the record to the agent for approval and immediate sending. Thus, this process will periodically interrupt the agent, throughout the agent's shift, for approval of sending of the LC message text in operation 236. This interruption and the indication of a need to approve the sending of the LC message could be accomplished by automatically opening a screen on the agent's computer display, or providing a notification (via e.g., a flashing icon) that the agent should open such a screen for approving the next record. This information may further provide the agent with the form and contents of the limited content message, such as reflecting the recipient's name, the agent's name, and optionally the suggested callback times. In some embodiments, the agent may be able to edit the suggested callback times, if appropriate. Once the information is presented to the agent for consideration, the agent will approve the sending of the text in operation 238. This again can be provided by selecting a function key, pressing a key, or clicking a mouse, however appropriate. The limited-content message text is then sent in operation 240.

This approach still allows the agent to control the whether the text is sent, but the time it is sent is largely may be further determined by the system. Consequently, the appropriate calling window and BTTC algorithms can still be used, but they are applied after the record information is presented to the agent and approved by the agent. If there are remaining records in operation 242, then the process repeats back to operation 234, otherwise the process has completed.

In this approach, there are various mechanisms that may be used to inform the agent that there is a need to approve the sending of a LC message text. This can occur, for example, by periodically displaying an icon, informing the agent to approve a message to be sent or by periodically displaying some other reminder for the agent to approve the message. Those skilled in the art will appreciate that various graphical user interface options are possible for this purpose.

Option 4

Figure 2B:
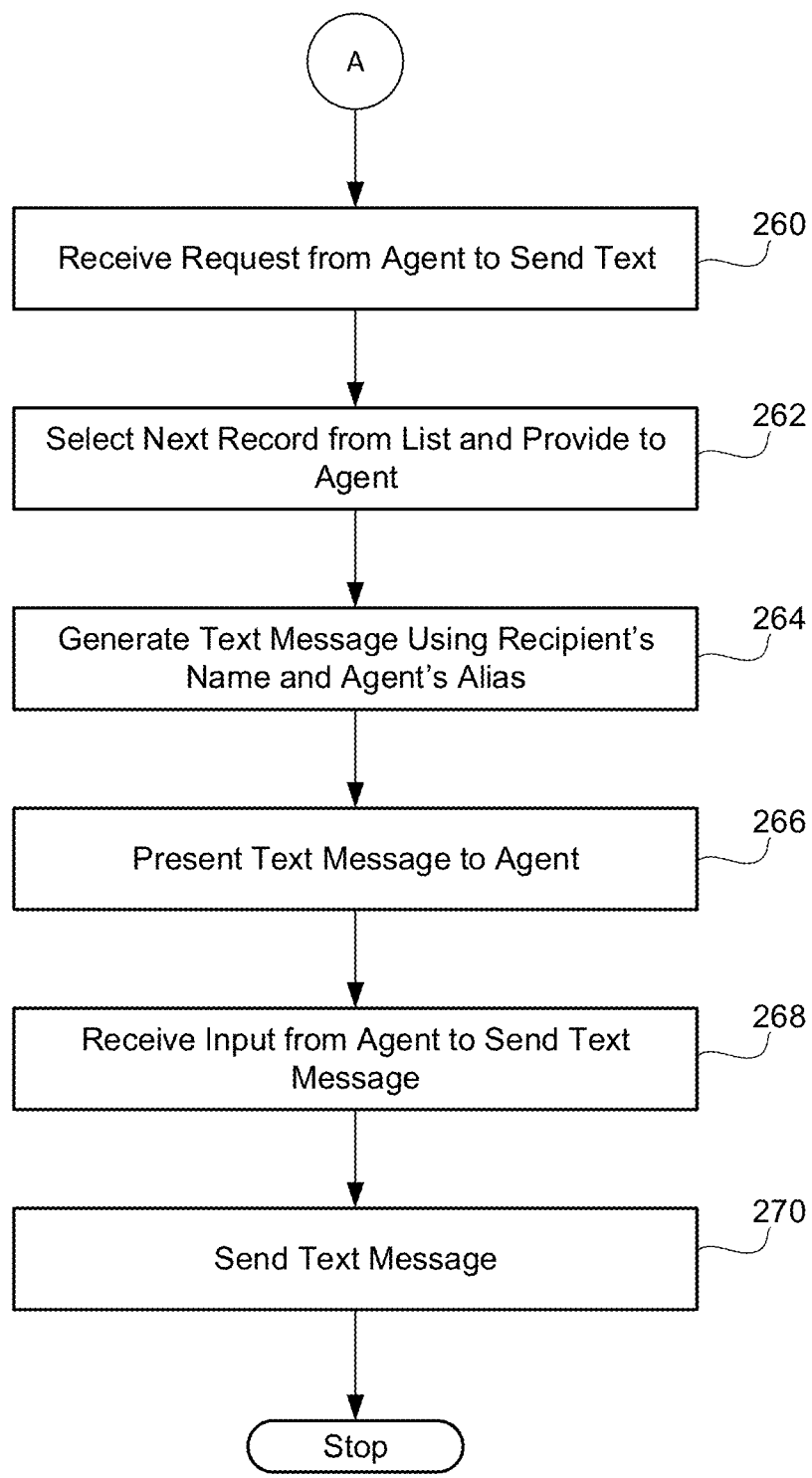

The next option, indicated by connector 244, is illustrated in an embodiment shown in FIG. 2B. In this embodiment, there is no segregated list prepared for the agent. While there is a list of records which are to be sent for the current shift or day, the list can be accessed by a plurality of agents who are currently working. Thus, the list is not segregated beforehand for the various agents. Thus, as agents request a record from the list, that record will then be allocated to that agent, and then sent. This means that if none of the agents select records from this list, there will be no LC messages sent. Stated otherwise, the list represents an aggregate quota or goal for the entire group of agents, as opposed to dividing the list into sublists where each is a quota or goal for a selected agent (as in the earlier discussed options).

The process begins with operation 260 in FIG. 2B with the agent indicating a request to initiate a limited-content message text. The agent can make this request whenever they are able to do so, i.e., when they are not handling any calls. Thus, this can be an effective form of agent fill-in work to take up the periods of 'slack' during their other work duties. Further, because each limited-content message is sent as the result of human intervention, there is a case that the agent has not used an automatic telephone dialing system ("ATDS") to initiate the call.

The agent may make their request in operation 260 in response to a notification via a widget on their desktop computer reminding them to make such a request. Other widgets can be displayed to the agent reflecting a target daily or hourly goal of a certain number of requests to make. For example, a percentage quota indicator can remind the agent where they are relative to their daily work expectations. Thus, there are ways to encourage or pace the agent's initiating of such requests.

Once the request is received, the next record from the list is selected in operation 262 and provided to the agent for review. More will be said about possible user interfaces that the agent may utilize at this step. The agent will be presented with information related to the contents of the limited-content message that will be sent in operation 266, and the agent will be prompted to approve the sending of the limited content message in operation 268. Once given by the agent, then the message will be formed and sent in operation 270. Thus, this option allows the agent to control how many limited-content messages will be sent.

Although it is possible to apply best-time-to-call algorithms to determine the specific time when to send the LC message text after agent has approved sending it, in many embodiments there is minimal delay from when the agent approves the text and when the text is sent.

Graphical User Interfaces

Figure 3:
FIGS. 3 and 4 illustrate embodiments of a graphical user interface presented to an agent to confirm the generation of limited-content text message to a list of recipients.

The agent may interact with a graphical user interface ("GUI") to review and approve of the records for which limited-content messages are to be sent. Once such interface associated with the first option of is shown in FIG. 3. This user interface or screen image presented to the agent 300 reflects that the agent provides a single input to approve an entire list of accounts, which have been extracted for that agent.

Turning to FIG. 3, the user interface 300 include information about the agent's name and alias information 310. The agent's actual name is "Linda Jones" and their alias name is "Robin Smith." The list of account names 320 is shown in a separate box, with a scroll bar control 325 that allows viewing of all the names in the list. In other embodiments, the agent may be provided with controls to delete identified names.

The text box 330 shows a representative limited-content message that will be generated using the account's name and the agent's alias name. The message further includes the callback number and suggested dates/times for the callback. Other formats may show only a subset of the fields. The agent may confirm that the included callback times are accurate (i.e., that the agent is working at those times). In other embodiments, the agent may be able to edit the suggested times to correspond with their work schedule, or alter other fields.

The agent provides their approval by selecting function icon 340, to indicate approval. This approval indicates that the system can generate and send the limited-content messages to the list recipients according the time most appropriate. At this point, the agent's interaction with the limited-content generation is largely completed.

Figure 4:
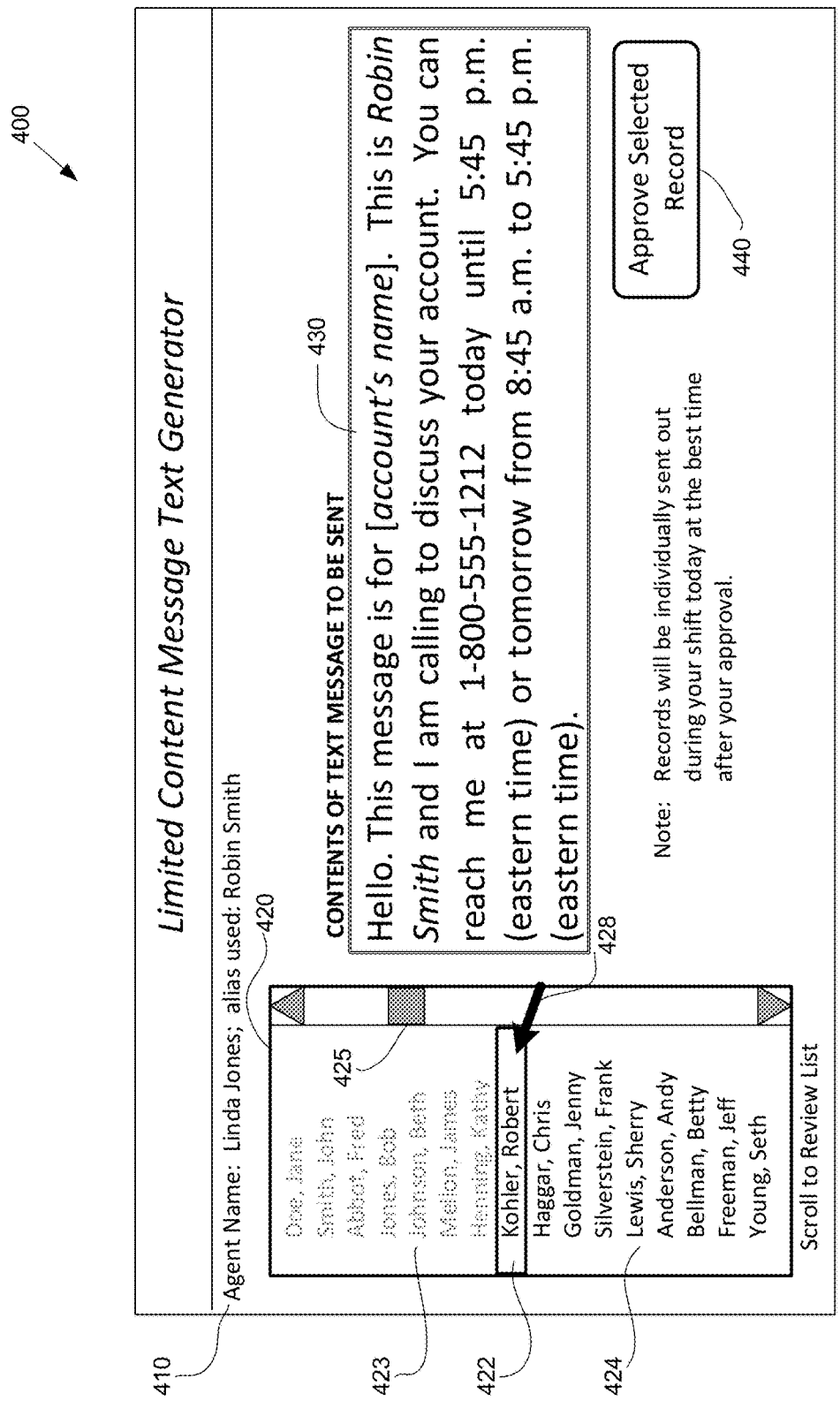

FIG. 4 is a slight variation that may be used with Option 2. The user interface screen image 400 in this embodiment again includes information 410 reflecting the agent's actual name and alias name. The text box 430 again reflects the text customized for that agent, reflecting the agent's alias name and the suggested callback times, which should be correlated to when the agent is available. The list 420 again reflects a plurality of names, but in this case the agent can select a particular name associated with a record 422 using a cursor 428 and approve the sending of that LC message for that recipient using the function icon 440. The names that have been approved 423 (and for which LC messages have been sent) may be shown in a different font or color, while the currently selected name 422 may be highlighted in some manner. Those names remaining to be selected for approval 424 may be distinguished by their font or color. The agent is anticipated to provide input via the function icon 440 for the selected record/name, and the next recipient will be automatically highlighted, and the interface will await the agent's approval. Thus, the agent may simply, repeatedly, and quickly, select the function icon 440 to signify their approval, causing the limited-content message texts to be generated to the indicated account at the appropriate time. The agent can then be said to have provided human intervention for causing each message sent. In a variation of this embodiment, the agent could select a group of names which are approved, rather than just one name.

Figure 5:
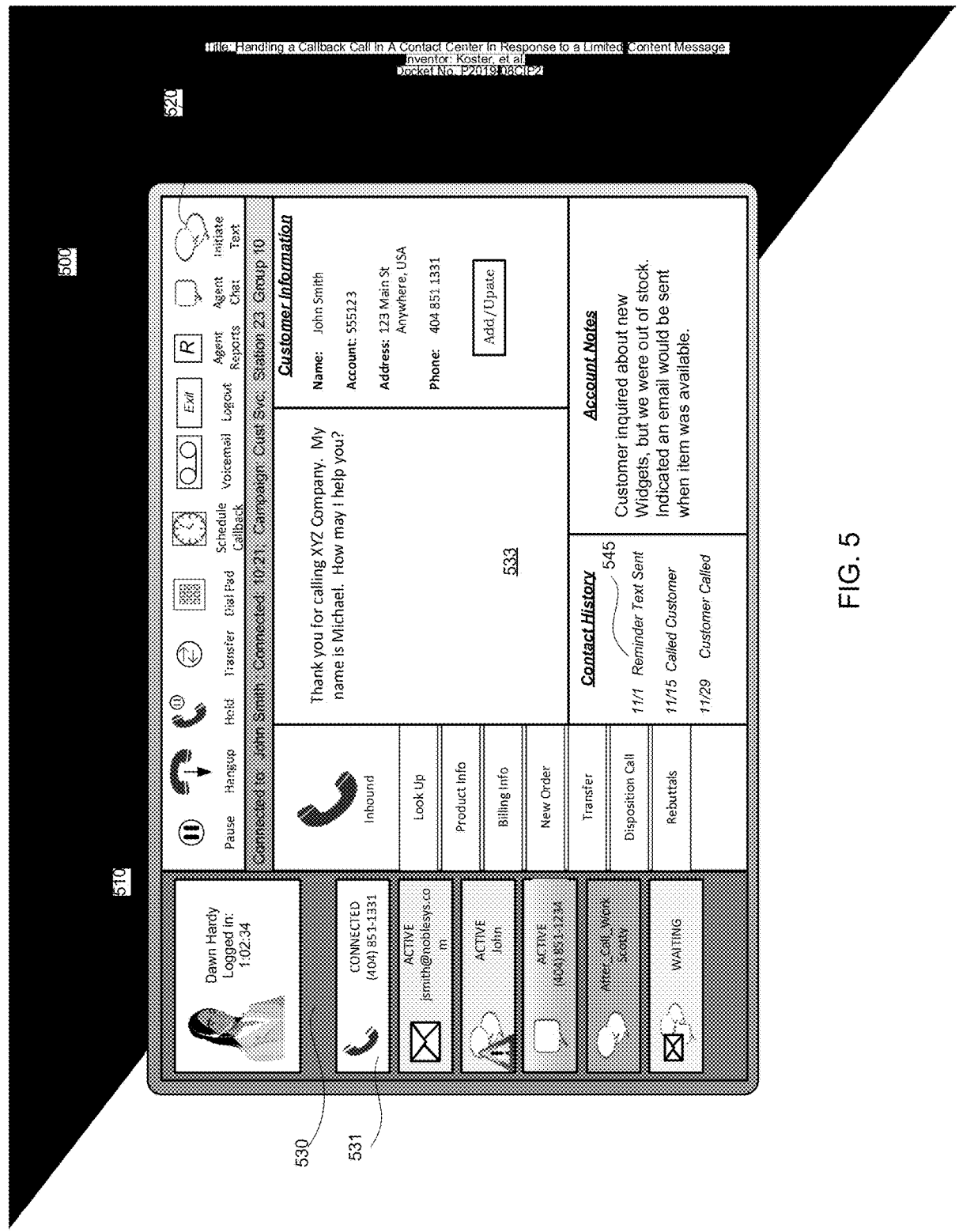
FIG. 5 illustrates one embodiment of a graphical user interface comprising a widget for approving the generation of a limited content text message.

FIG. 5 illustrates a GUI that the agent may view while handling a voice call. This GUI image 500 comprises a widget pane 510 that includes a series of widgets that are functional icons for invoking functions and/or providing indications related to a capability. In particular, one widget 520 may be selected by the agent to initiate the sending of LC message text. In other embodiments, the widget could flash or otherwise change a visual characteristic to indicate to the agent that it is appropriate time to request the initiating of sending a LC message text.

Figure 6:
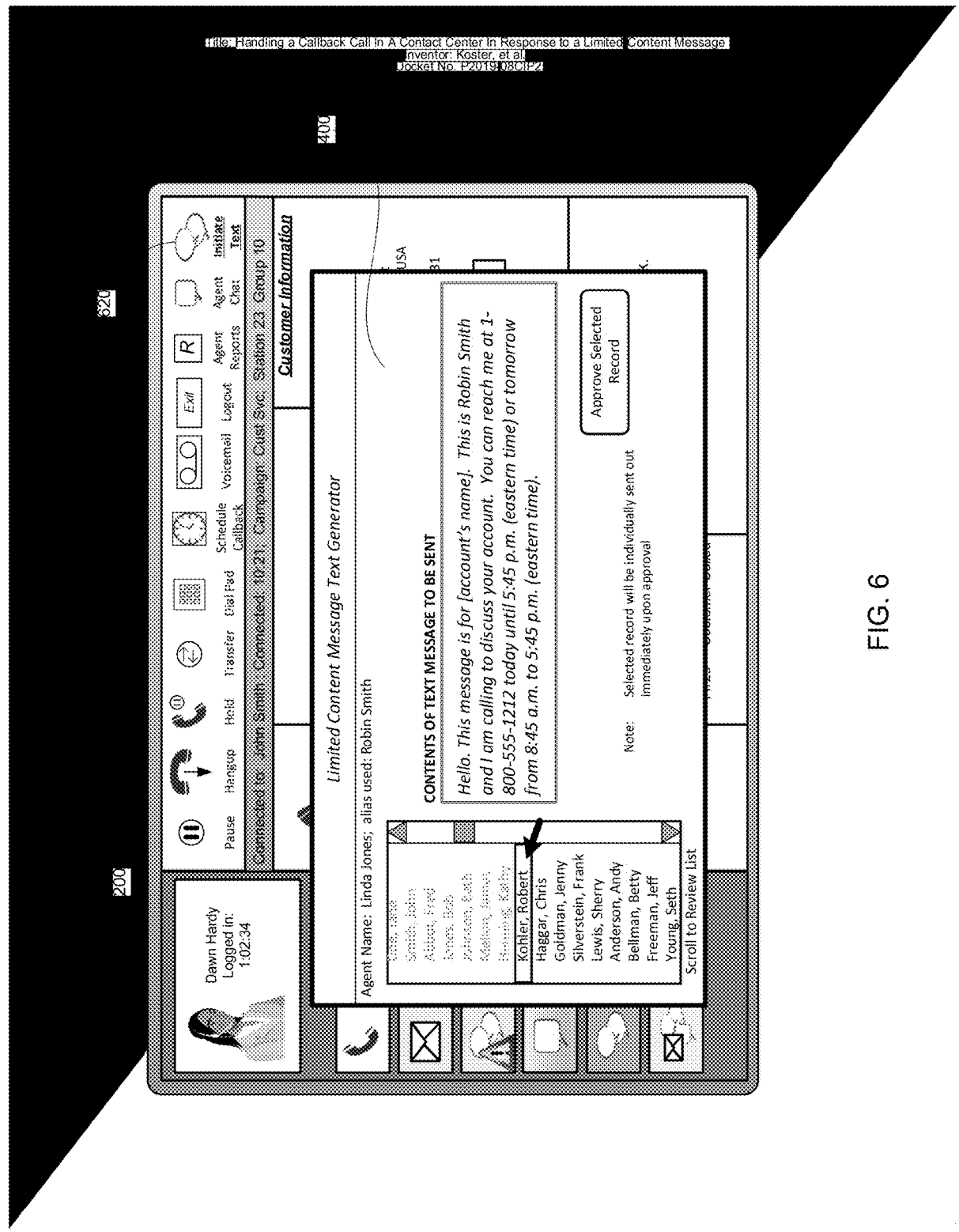
FIG. 6 illustrates one embodiment of a graphical user interface for approving the generation of a limited-content text message.

Turning to FIG. 6, once the widget visually informs the agent that it is appropriate timing-wise to send a LC message, then agent may then selects the widget 620. In response, the screen pop 400 shown in FIG. 6 may appear. This screen pop 400 is similar to the earlier shown user interfaces, but this results in the LC message to the selected record being sent immediately, without subsequent delay.

Consideration of an Agent's Scheduled Shifts

Figure 7:
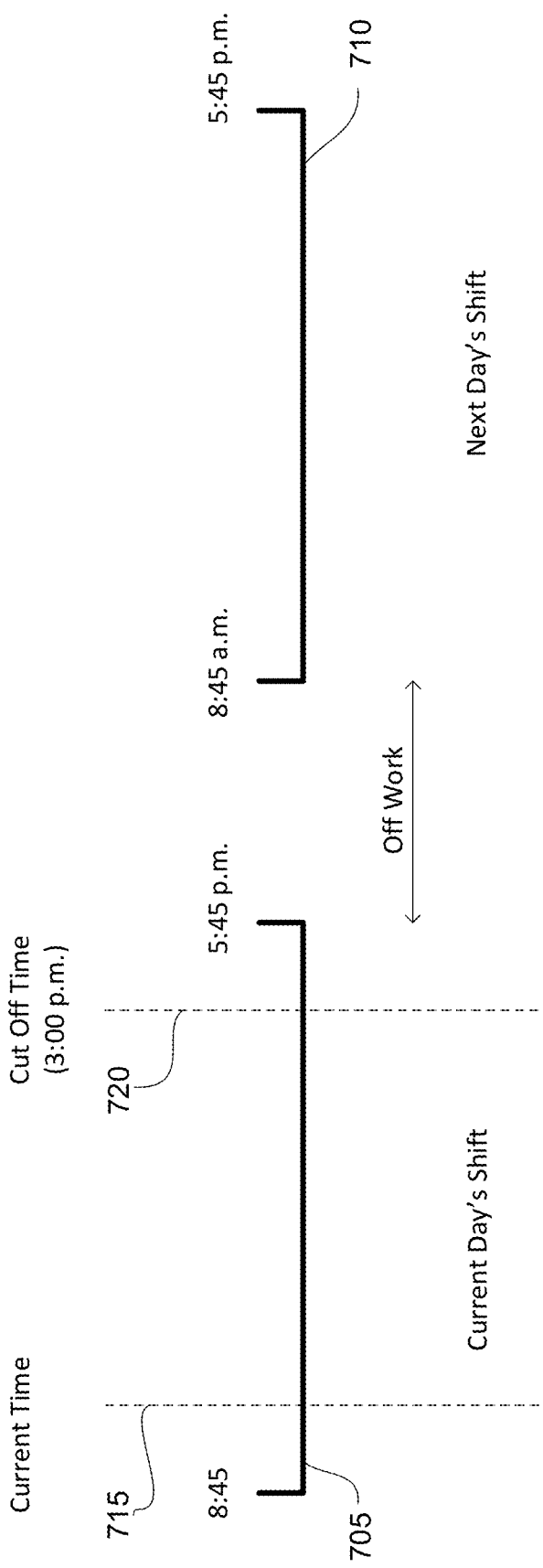
FIG. 7 illustrates one embodiment of an agent's work shifts.

The contents of the LC message and the timing of when the LC message is sent may be impacted by the scheduled shift times of the agent. FIG. 7 illustrates a timeline representing a shift 705 of the agent for the current day, starting from 8:45 a.m. and ending at 5:45 p.m. There is a time where the agent is off work, and then the next day, when the agent begins another shift 710, again from 8:45 a.m. to 5:45 a.m.

The current time is illustrated by line 715, which is shown as relatively early into the current days' shift. LC messages sent out at this time may be likely to result in a callback within that current day's shift. However, if all the LC messages are sent out at a point later in that shift, e.g., at line 720 (referred to as the "cut-off time"), then it can be expected that many of the callbacks will occur after the agent has completed their shift that day. The exact time of the cut-off time relative to the end of the agent's shift may vary, and it may be gleaned from experience. However, it is clear that the closer to the end of the agent's shift that the LC messages are sent, the greater the likelihood that callback calls will be missed that day by the agent or will be received the next day.

Further, messages sent out past a certain time during the shift 705 of the current day, such as the cut-off time 720, may result in the LC Message content needing to reflect a different suggested callback time. For example, sending a LC Message out after 3:00 p.m. may result in the LC message suggesting a callback time of "up to 5:45 p.m. today, or between 8:45 a.m. and 5:45 p.m. tomorrow." In this manner, the recipient will know that if they cannot call back within 5:45 p.m. today, that they can do so tomorrow.

Consequently, there is a point during a day's shift, in which LC messages sent out and the corresponding callback is not expected to occur (i.e., more likely than not) during that current shift, but will overflow over to the next shift. When this is expected to occur, the contents of the LC Message should reflect the next available times of the agent. For example, if the agent is unavailable the following day, the suggested callback may indicate a date/time for when that agent is available.

Process Flows

Recall from FIG. 2A that Options 1-3 were predicated on identifying a list of records (a subset) from a larger set of records, which are to be sent by the agent. Option 1 presented the agent with a list which would be approved on a batch basis (i.e., one approval by the agent would approve all the records in the list), and the corresponding LC messages for each record would be then sent at the appropriate time. Option 2 presented the agent with a list, where the agent would have to approve each record, and once approved, that record would be sent at the appropriate time. Thus, in contrast with Option 1, Option 2 allowed the agent to control if a record was approved. Finally, Option 3 presented the record for the agent to approve at the best time for sending the LC message, wherein the LC message text would be sent immediately after approval. Options 1 and 2 could be referred to as "deferred" sending and Option 3 could be referred to as "immediate" sending after approval.

Figure 8A:
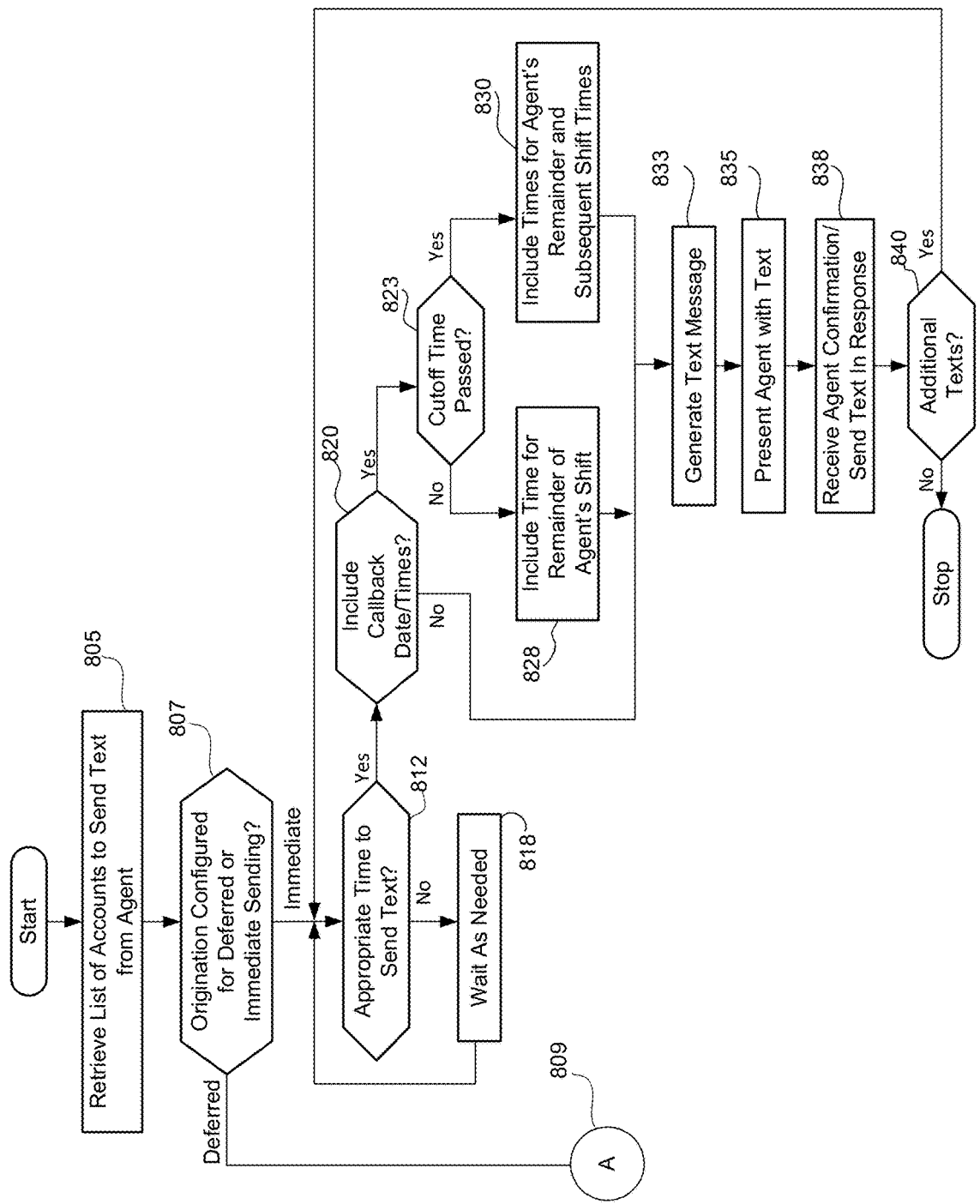
FIGS. 8A-8B illustrate one embodiment of a process flow for sending out limited-content text messages at various times.

FIG. 8A shows one embodiment of the process flow, where the larger set of records is processed to determine how many should be allocated to a particular agent. Once this is performed, the agent-centric list of accounts can be retrieved in operation 805. Next, a determination is made in operation 807 for that agent whether the LC messages will be sent out on an immediate or deferred basis. If the immediate sending after approval occurs, then the next process involves determining when is the appropriate time to send the text in operation 812. This may be determined by a best-time-to-call ("BTTC") algorithm. Alternatively, the LC messages could be sent by simply 'spreading' the sending of LC message texts over a fixed time period, or by simply sending a LC message text periodically. However, the timing of the message sending is determined. If the time to send has not occurred in operation 812, then the process waits in operation 818 until it is appropriate to send out the next LC message text in operation 812.

Next, a determination is made in operation 820 whether the LC message includes the optional callback times. If not, the process continues to operation 833. However, if the LC message is to include a callback date/time, then a second determination is made in operation 823 whether the cutoff-time for that agent has passed. If so, then this may be used to determine whether the suggested call back time will include the following day's times for a callback. Thus, if the cutoff time in operation 823 has not passed, then the LC message may only include the remainder time for the current day's shift for the agent as indicated in operation 828. (For example, the LC message may indicate to call back before 5:45 p.m. today). If the cutoff time in operation 823 has passed, then the LC message may include the following day's times in operation 830. (For example, the LC message may indicate to call back before 5:45 p.m. today or between 8:45 a.m. and 5:45 p.m. tomorrow.)

The process then proceeds to operation 833 where the LC message text is generated with the appropriate name for the agent and the optional suggested call back times, if desired. Next, the agent may be presented with the text for approval in operation 835. This may be presented in a pop-up screen, such as shown in FIG. 6. Once the agent approves the sending of the text in operation 838, another test determines in operation 840 where there are additional texts for the agent to approve. If so, the process loops back to operation 812 when the next appropriate time for the next sending the record is determined. Otherwise, the operation is completed.

Figure 8B:
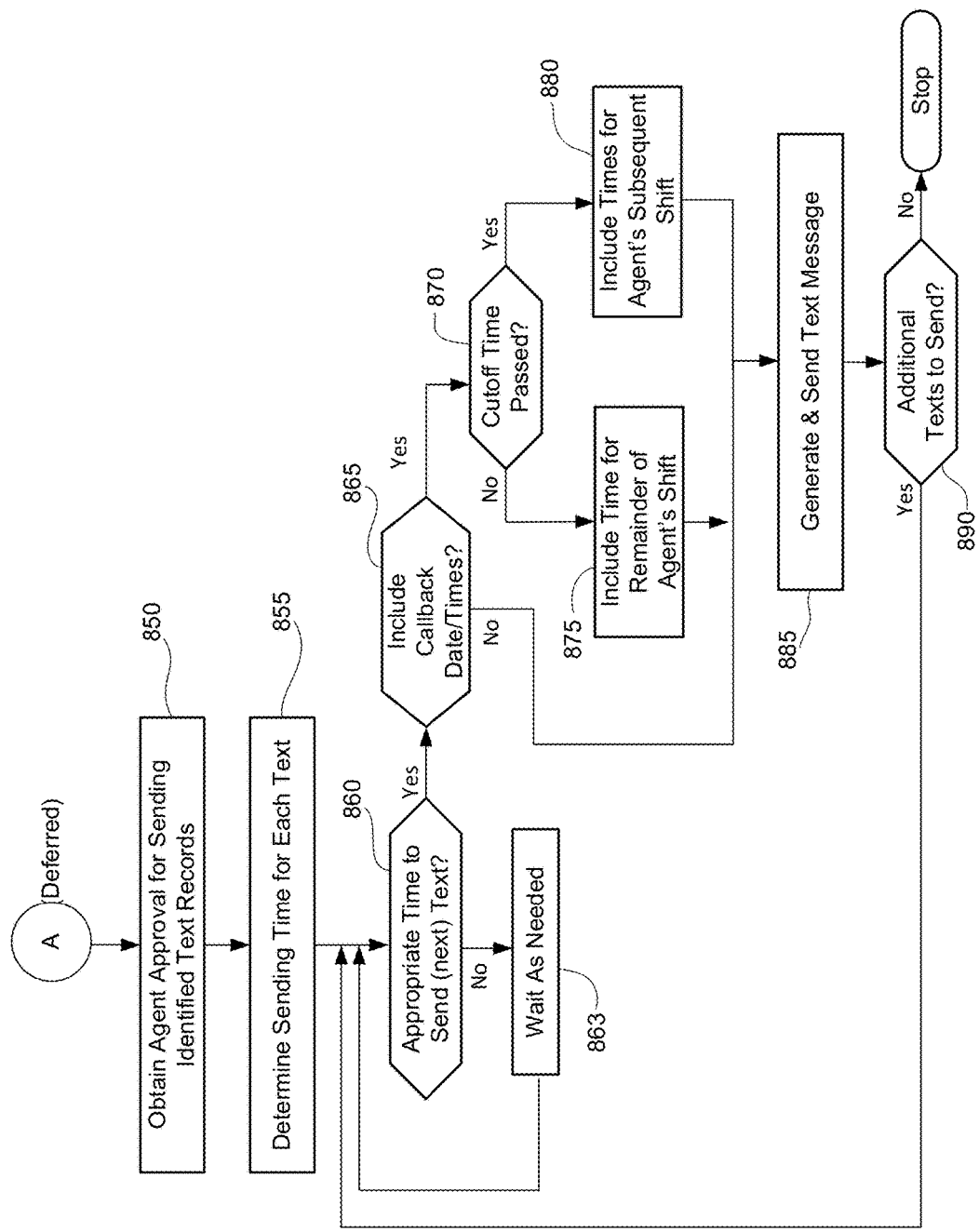

Turning to FIG. 8B, this process flow illustrates aspects of when the sending of the LC message is deferred relative to the agent's approval. This corresponds to Option 1 and Option 2 discussed earlier. After identifying the records of the accounts the agent is to approve in operation 805 of FIG. 8A, and proceeding to label A 809 of FIG. 8B, the accounts to receive the LC message are presented to the agent and the agent provides their approval at operation 850. At this point, the agent's interaction with the GUI ends, and other background processes begin.

One of the next operations involves determining the time to send each LC message text in operation 850. This could be based on the application of a best-time-to-call predictive model, or an algorithm which merely 'spreads' out the sending of the number of texts periodically over a time period. The spread for sending a number of texts could be based on a linear (periodic) intervals, or based on a non-linear algorithm. For example, each text could be scheduled to be sent out after one minute from the prior text. Or, a schedule could be defined wherein the number of LC messages sent periodically diminishes exponentially over time. Once the schedule is determined, then operation 860 waits in conjunction with operation 863 until the time arrives to send the next LC message, leading to operation 865.

There, in operation 865, a test is made to determine whether the LC message text has been configured to include suggested callback date/times. If not, then the message is sent in operation 885. If the information is included, then a determination may be made in operation 870 whether the cutoff time has passed for the particular agent indicated in the LC message. If the cutoff time has not been passed, then the operation continues to operation 875 where the times for the remainder of the agent's shift is included. If the cutoff time has passed in operation 870, then the LC message text may include the agent's subsequent times for their next shift. Once the proper content of the LC message text is determined, then the LC message text is generated and sent in operation 885. If there are additional texts to send in operation 890, then the process loops back to operation 860, otherwise the process is completed.

If the agent works the same scheduled shift each day and for consecutive days (e.g., 9-5 each workday, Monday-Friday), then the LC message text could include a suggested callback time that reflects the agent's work shift for more than one day. In some instances, the suggested callback times can be populated without consulting the agent's schedule, if the agent works the same shift on all working days. However, when the agent works different times during the week, or different days during the week, then automatically including the same callback time over multiple days (which would be inaccurate) can be suboptimal for connecting the called party with the agent. The called party may initiate a callback call desiring to speak to the named agent, and that agent may not be working. If the called party is not ready to speak with another agent, then a valuable opportunity to speak with the called party may be foreclosed for a limited time.

Processing of Callback Calls

The above discusses the generation of the LC message texts to the called party. Once sent, the called party will have received a text that indicates the name of the agent they are to call, a telephone number, and an optional suggested date/time. The desired outcome is that the called party then initiates a callback call to the name debt collector.

The callback call frequently may be answered by an interactive voice response unit (IVR) or other announcement generating device that may provide certain information to the caller, such as information that the call may be recorded or that the information provided may be used in collection of a debt. The IVR can also ascertain which agent the called party intended to speak with (if not previously determined by using the calling party number of the caller to identify a LC message, and the agent identified therein). This can be done in various ways. The IVR could prompt the caller to identify the name or the IVR could ascertain what text was recently sent out to that individual, and what agent was identified in that that text. Once the agent is determined and/or confirmed, the IVR may determine whether the agent is available, and connect the caller to the agent, or if the agent is unavailable, the IVR may then select another agent for the called party to speak with.

Figure 9:
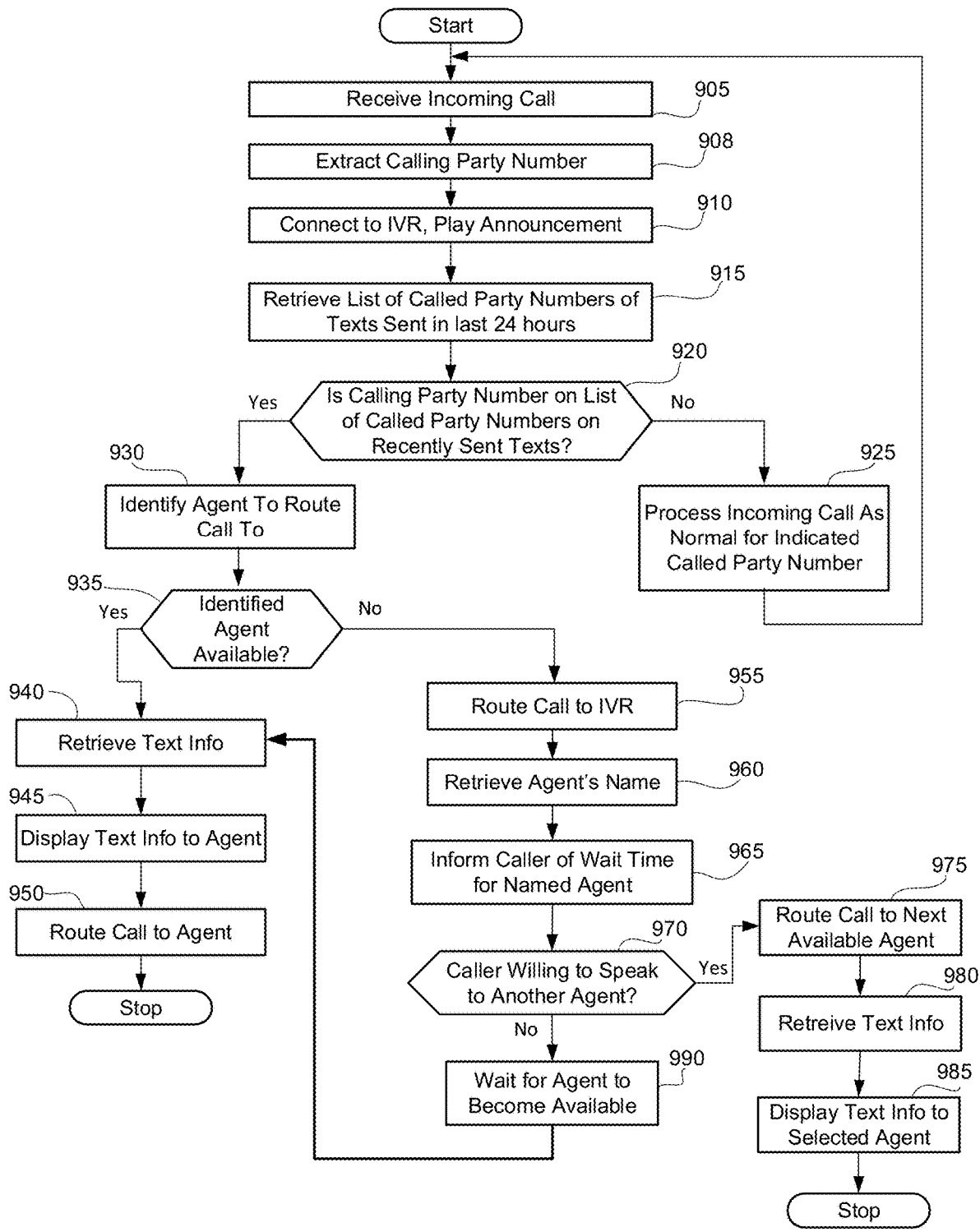
FIG. 9 illustrates one process flow for handling a callback call that is a response to a limited-content text message.

Turning to FIG. 9, one embodiment of the process flow is illustrated. The process begins with receiving an incoming call in operation 905. The calling party number is extracted in operation 908. This may be used to identify the agent associated with the caller. If so, there is no need to prompt the caller as to which agent they request to speak with. The call is then connected to an IVR in operation 910, which may play various appropriate announcements. The announcements may include information that the call is being recorded, that the information may be used in collecting a debt, as well as informing the caller whether the intended agent is available, or whether the caller will speak with another agent.

Next, a list of called party numbers to whom LC message texts were recently sent to is retrieved in operation 915. This may involve texts sent within the last, e.g., 24 hours. It is presumed that if a debtor does respond to a LC message text to initiate a callback, the vast majority will do so within 24 hours. If this assumption proves incorrect, then the timeframe may be altered as appropriate.

Next, a test determines whether the calling party number of the present call matches one of the called party numbers of the recently sent LC message texts in operation 920. If there is no match, then it may be presumed that the caller is not responding to a LC message text sent to them. In some embodiments, the time period for recently sent LC message texts may be defined as e.g., 24 or 48 hours. That is, a caller who is calling after that time period may be assumed as not responding to an LC message text. If so, then the incoming call is processed as normal in operation 925. This may involve routing the call to the next available agent. It is possible that the caller is initiating the callback call from a different phone from the one which the LC message text was sent, hence the calling party number may not be on the list. Or, it is possible the caller is calling for another reason, i.e., not in response to the prior LC message. Consideration should be given that the caller is using a different phone number to initiate the callback. For example, a caller may receive the LC message text on their smartphone, but initiated the callback using their home phone. In this case, the account information may have an alternative number in the account information that it can use to correlate the incoming call to the previously sent LC message text.

If the calling party number is on the list of recently sent LC message texts in operation 920, then it is presumed that the caller is responding with a callback. The agent identified in that outgoing LC message text is determined, which is the agent the caller is to be routed to, in operation 930. Once the agent is identified in operation 930, a test is made in operation 935 to determine whether the identified agent is available in operation 935.

If the agent is available, then information related to the sent text is retrieved along with any pertinent account information in operation 940. That information is displayed to the agent in operation 945, so that when the agent is connected, the relevant information is available and presented if desired to the agent. The call is then routed to the agent in operation 950. Thus, the callback call is routed back to the identified agent, and the agent is presented with information indicating that this is a callback call that the caller made in response to receiving a prior LC message text. For example, returning to FIG. 5, a voice-oriented GUI is presented to the agent, with information 545 indicating that a reminder text was sent. Other icons could be presented to indicate to the agent that this is a callback type of call.

However, the identified agent in operation 935 may not be available. The agent may be on another call, the agent may be in training, on a break, or otherwise occupied. If so, the call is routed to the IVR in operation 955 (or it may already be connected to the call). The IVR will obtain, or is otherwise aware of, the agent's name in operation 960. In this embodiment, the IVR will inform the caller of an anticipated wait time for the name agent in operation 965. The IVR at this point may perform various options. In this embodiment, the operation shown 970 queries the caller as to whether they would be willing to speak with another agent. In other embodiments, the IVR could prompt the caller for a callback call, leave a message, schedule another time, etc.

Assuming that the caller is not willing to speak to another agent in operation 990, the caller will wait for the named agent to become available. Once available, the process continues at operation 940, where the call and related information is routed/presented to the named agent. If the caller is willing to speak to another agent instead at operation 970, then the calls is routed to another available agent in operation 975. Information related to the callback nature of the call, and possibility other information will be retrieved in operation 980. Finally, that information is then displayed to the selected agent in operation 985. In this manner, the caller is queried if they wish to speak to another agent that is available, and that available agent has all the information related to the context presented to them, so that the available agent is aware that the caller expected to speak with the named agent, but instead is now speaking with another agent.

Determination of Calling Windows

The transmittal of the LC message text to the debtor must take into account a number of factors for determining the allowable calling window. The calling window refers to the allowable times when the LC message text may be sent to the debtor. The LC message text cannot simply be generated at any time convenient for the sender, according to various regulations, which consider a text to be a "call" similar to a voice call. Thus, the LC message text is treated similar to a voice telephone call, in that voice telephone calls are prohibited during certain times. The allowable times are called the "calling window."

Generally, absent approval from the called party, the LC message text should not be sent earlier than 8:00 a.m. and no later than 9:00 p.m. relative to the local time of the called party. The determination of the local time zone of the called party requires knowledge of the location of the called party, which may have to be presumed based on other information, such as their address or a nominal location of their telephone number (i.e., based on the area code and central office code portion of their number). There may be other information maintained by the debt collector as to the actual location of the called party and any particular inconvenient times.

Figure 10:
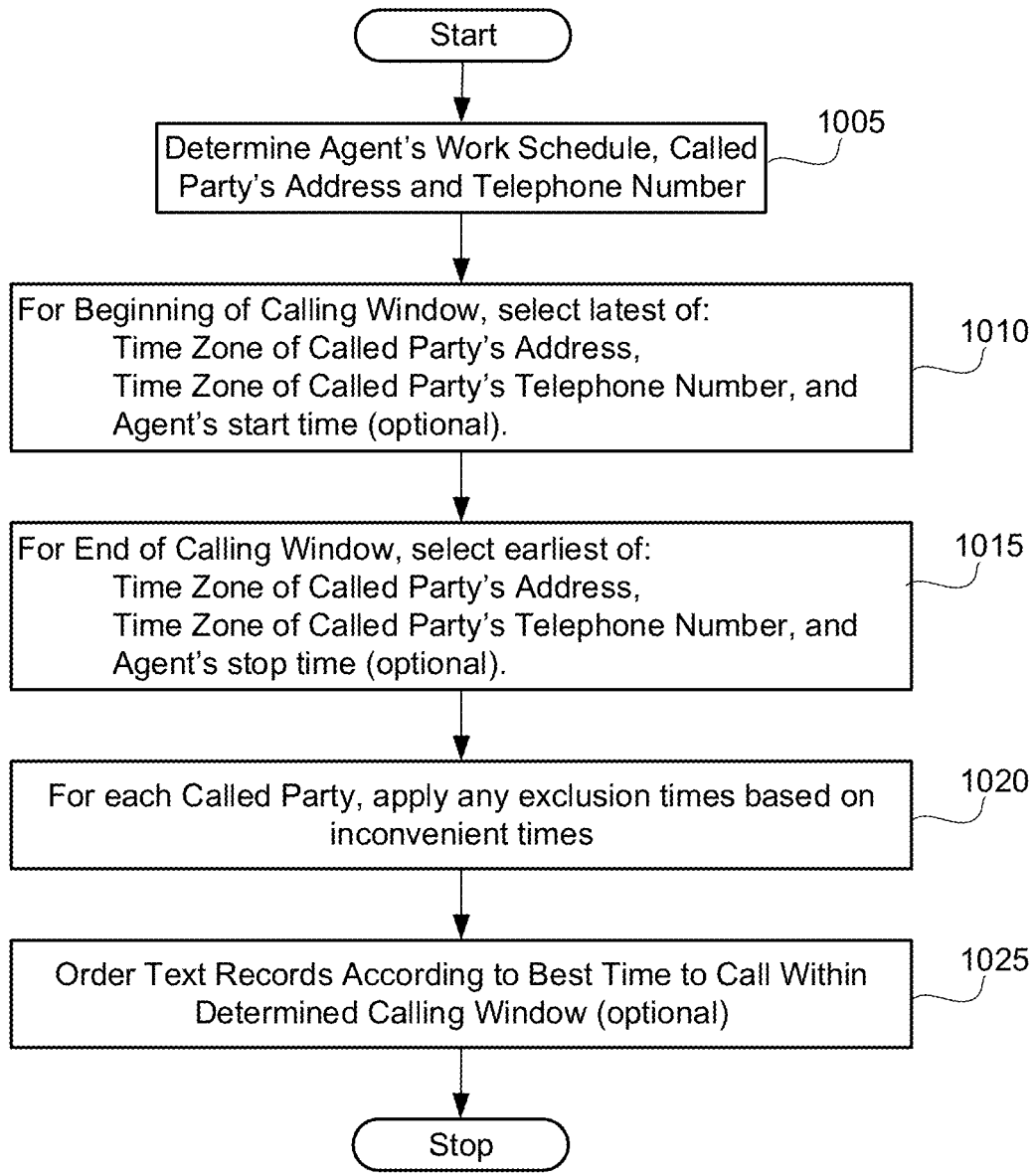
FIG. 10 illustrates one process flow for determining a calling window to send out a limited-content text message.

FIG. 10 illustrates one embodiment of a process flow for determining the allowable calling window when a LC message text can be sent. The process begins in operation 1005 with determining the agent's work schedule, the called party's address, and the called party's telephone number.

Next, in operation 1010, the beginning of the calling window is determined. This can be determined by the later of the time zone in which the called party's address is based, and/or the time zone associated with the called party's telephone number. Another factor which can be taken into account is the agent's start time.

For example, if the called party has a California address, this would be associated with the Pacific Time Zone. However, the called party may have a New York based mobile number, which suggests an eastern time zone. The reasons for this may vary. The debtor may have obtained their cellphone service while living in New York and relocated to California. The debtor may have a California address, but spends a great deal of time on the east coast. The debt collector may know that only one of these two criteria is to be used, or may be unsure and simply used the information that results in a 'safer' outcome (i.e. where both outcomes comply with regulations). For example, if the debt collector is located in the eastern time zone, and is unsure whether the debtor is located in the eastern or pacific time zone, the debt collector may wait until 11:00 a.m. eastern time before sending a LC message text. If so, then the text may arrive at 8:00 a.m. if the debtor is located in the Pacific time zone or 11:00 a.m. if they are located in the Eastern time zone, but in either case, neither is a violation of sending the text prior to 8:00 a.m. relative to the debtor's local time.

The sender of the LC message text may also consider the work shift of the agent in operation 1010. If the LC message text requests the recipient to call back to speak with a particular agent, and that agent is not presently working, then the recipient may callback requesting to speak with the named agent who will be unavailable. Thus, it may be preferable to also consider the timing of the agent's shift.

Next, a similar operation is performed in operation 1015 for determining the end of the calling window. This process involves selecting the earliest of the time zone associated with the called party's address or phone number and may also similarly take into account the agent's work times. Finally, in operation 1020, the debt collector may further maintain information known to be an inconvenient time for the called party, which may be derived from prior communications with the debtor. For example, the debtor may inform a debt collector that each morning between 8:00 a.m.-9:00 a.m. is an inconvenient time. These exclusions times may be consideration in operation 1020 as further modifying the allowable calling windows.

Finally, an optional operation 1025 is shown for ordering the records according to their calling times. This facilitates sending the records or presenting the records to the agent at the appropriate time. The process is then completed at this point.

Selection of Records for Agents Sending LC Message Texts

As discussed earlier in conjunction with FIG. 2A, certain options for generating the LC message texts are based on lists being prepared for the named agent. The agent could approve the sending of the list or could approve each record in the list at the appropriate time. Regardless, a list is created that is associated with the agent.

Figure 11:
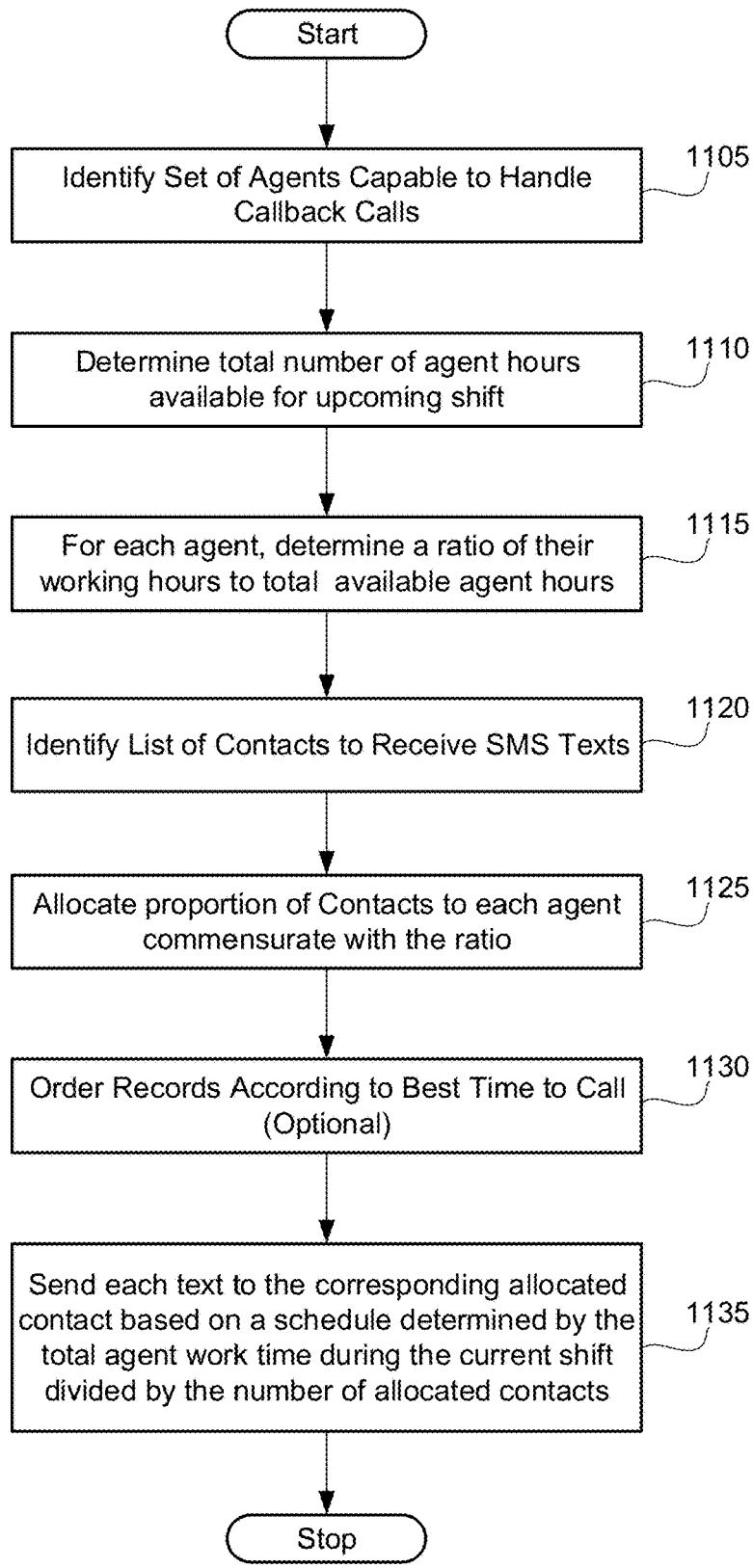
FIG. 11 illustrates one process flow for determining a list of recipients for an agent to be sent a limited-content text message.

One embodiment for a process to select records from a superset list of records to ascertain which records should be sent out indicating the named agent is shown in FIG. 11. The process begins by determining the set of agents that are available to send out LC message texts in operation 1105. For same of illustration, assume that for a particular day, there are 100 agents available. Next, a determination is made in operation 1110 of the number of agent hours available for particular day, taking into account all the agents which may be working partial shift, a whole shift, or additional hours. For sake of illustration, assume that the total number of agent hours for that particular day is 550 hours. Next, in operation 1115, a ratio or percentage of the particular named agent's time relative to all of the available time is determined. Assume for sake of illustration, that the particular named agent is working 7 hours, which represents 7/550=1.27% of the total work hours that day.

Next, in operation 1120 the desired total number of contacts intended to receive LC message texts is identified. For sake of illustration, assume that there are 2890 contacts (total) that need to be sent for the particular day for all of the working agents. The next operation 1125 determines how many of the records, in this case 2890, should be allocated to the named agent. Since the named agent is expected to work a fraction of the total agent work hours, assumed to be e.g., 1.27% of the total agent hours, then this same percentage (1.27%) of the 2980 records should be allocated to the agent, which corresponds to approximately 37 texts. Thus, 37 records may be identified as being associated with the agent in operation 1125 and may be further ordered as to when they should be sent in operation 1130. The 37 records may be scheduled to be sent within the defined calling window and should be schedule to avoid any inconvenient times. The times scheduled for each record can be noted, and those times then used in operation 1135 to be when each corresponding record is transmitted to the corresponding contact.

Overview Summary

Figure 12:
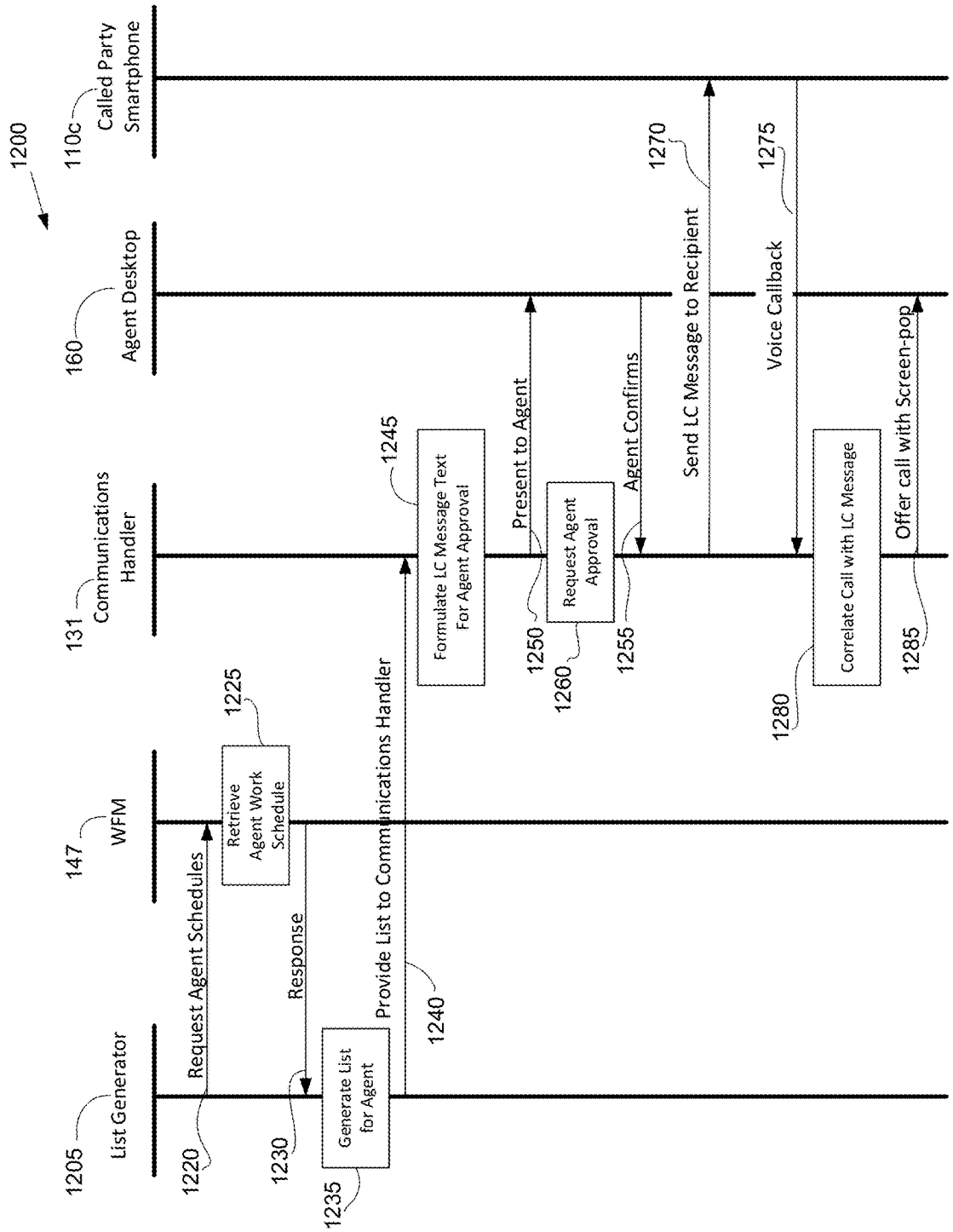
FIG. 12 illustrates one embodiment of a message flow for generating and sending a limited-content text message and handling a responsive callback voice call.

FIG. 12 illustrates one embodiment of a message flow intended to illustrate an overview of the different concepts. FIG. 12 illustrates a number of components, namely a List Generator 1205, a WFM 147, a Communications Handler 131, an agent desktop computer 160, and the called party's smartphone 110c. All components have been discussed earlier, except for the List Generator 1205. This may be a dedicated server which performs these functions, or the functions may be performed by the Communications Handler 131. The function performed by this component is to retrieve a superset of a list of accounts for which LC message texts are to be sent to, for all the agents in the contact center. The List Generator will extract an appropriate subset of the list superset to generate the list for a particular agent. Although discussed as a separate component, it could be performed using the same hardware platform as some of the other components found in a contact center.

The process begins with the List Generator 1205 requesting the agent schedules in message 1220 from the WFM 147. The List Generator needs to know what agents are working, and their corresponding schedules in order to properly create a list for each agent. The WFM processes the request in operation 1225 and returned the results in a response 1230 to the List Generator 1205. Next, the List Generator 1205 processes the information to create for each agent an appropriate list in operation 1235. The List Generator may take into account how many LC message texts are to be sent, how many agents are available to send the messages, what the average response rate and times are expected, and how many hours each agent will be working.

The List Generator than sends or otherwise indicates the list for each agent to the Communications Handler 131. There, the communications handler will provide context information in operation 1245 as to the contents of the LC message text to the agent at the appropriate time. The context information may include when the agent is working, their alia information, etc. In some embodiments, the preparation of the list may occur shortly after the agent logs into the communications handler. The information is presented to the agent in message 1250 in order to obtain agent approval 1260. This may cause the agent to see, e.g., the GUIs as shown in e.g., FIG. 3 or 4 in message 1240. After review, the agent may provide input confirming the list in message 1255.

A this point, the Communications Handler 131 (or some other component) has sufficient information to then generate the appropriate LC message texts to the called party via message 1270. The LC message texts will contain the appropriate name or alias of the agent and if included, the appropriate suggested callback times. The message may be sent at an optimal time for the called party, which may consider the calling window of the called party, the agent's schedule, the agent's current workload, and the optimal time to send the text in order to gain a response or desired result from the called party.

At some point, the called party will review the text and then may subsequently initiate a voice callback in message 1275 back to the indicated number. The call may be received at the Communications Handler (or in other embodiments, at an IVR), which will then correlate the calling party number of the incoming telephone call with the called party numbers indicated in the previously sent texts, in operation 1280. Once correlated, the Communications Handler knows which agent the call is to be routed to. Consequently, the Communications Handler selects the appropriate agent and offers the call using message 1285, along with screen-pop information informing the agent that the call is a callback call received after a LC message text was previously sent.

Application to Text-Based Callbacks

The above illustrates sending a LC message text which causes the recipient to initiate a voice-based callback call. The contact center receiving the voice call will match the calling party number with a called party number of the previously sent LC message text in order to identify which agent the voice call should be routed to. This same concept could be applied if the recipient responds back with a text-based callback. That is, when the recipient receives the LC message text, the recipient may opt to reply to the text via a responsive SMS text.

In this embodiment, the receipt of an incoming SMS text will result in comparing the originating or calling telephone number of the SMS callback text with the called number of a recently sent LC message text. If there is a match, then the agent that was associated with the LC message text should be the same agent (if possible) receiving the SMS callback text. The agent, upon receiving the SMS callback text, should be presented with information regarding the previously sent LC message text. This would allow the agent to have a better context of interpreting the SMS callback text. In some embodiments, the agent may continue the conversation with the debtor via text, or may request that the debtor call the indicated telephone number, or the agent may request authorization to initiate an outbound telephone call to the debtor. Any of these approaches allows the agent to essentially migrate the text-based communication session to a voice-based communication session, which may be more efficient for discussing a particular issue with the debtor. In other embodiments, the agent may request (via text) from the debtor a time to schedule a voice callback call with the debtor.

Exemplary Callback Call Processing

Previously, options were identified in FIG. 9 for how a callback call could be processed. Additional options for processing a callback call are shown in in FIGS. 13-16. These process flows illustrate how different options may be invoked in a serial manner, based on current conditions. As will be seen, there is flexibility as to how the order of the options may be invoked or combined, and some options may not be implemented at all, as a matter of policy.

Figure 13:
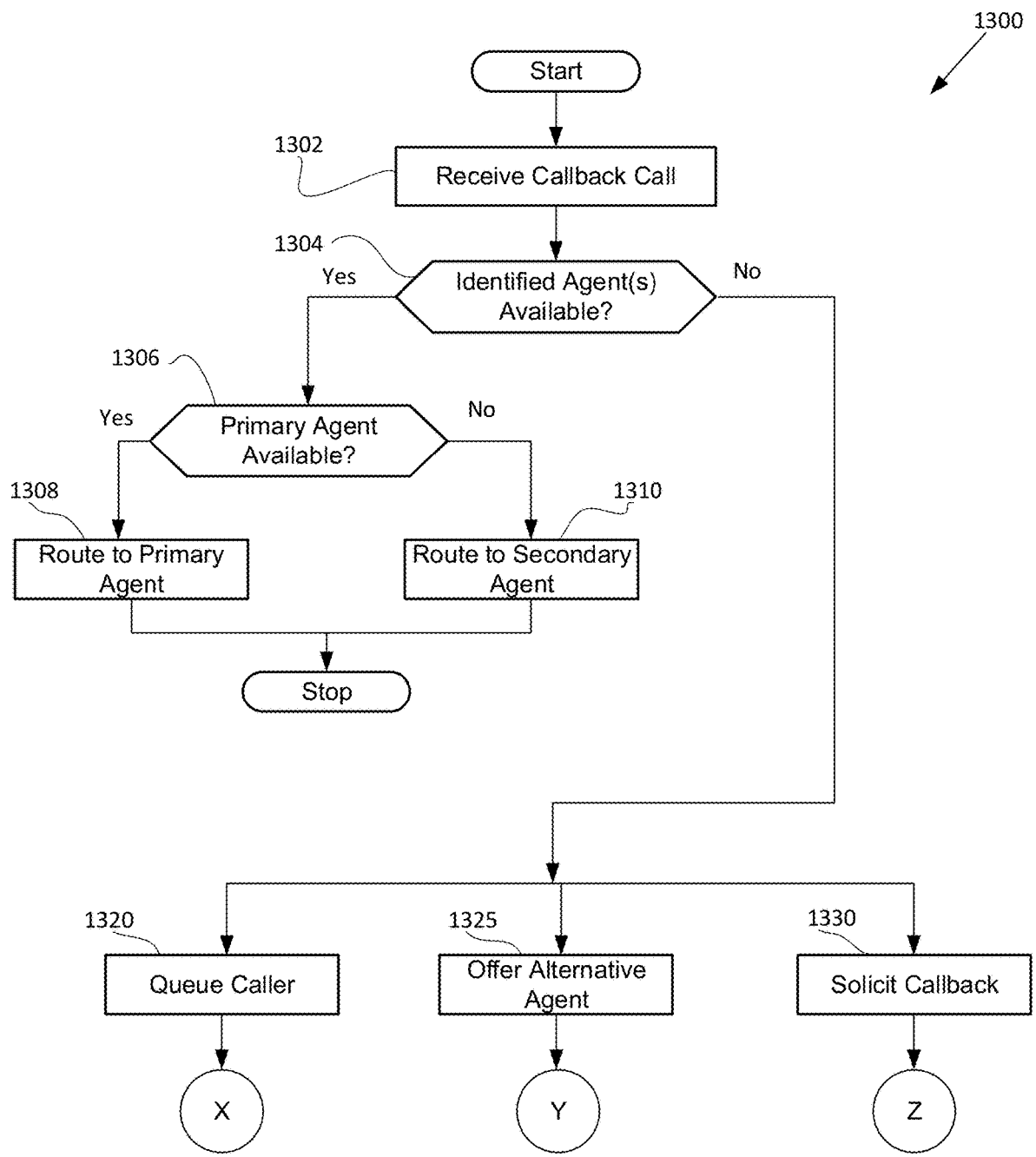
FIGS. 13-16 illustrate embodiments of how a callback call can be processed for connecting the caller with an agent.
Figure 14:
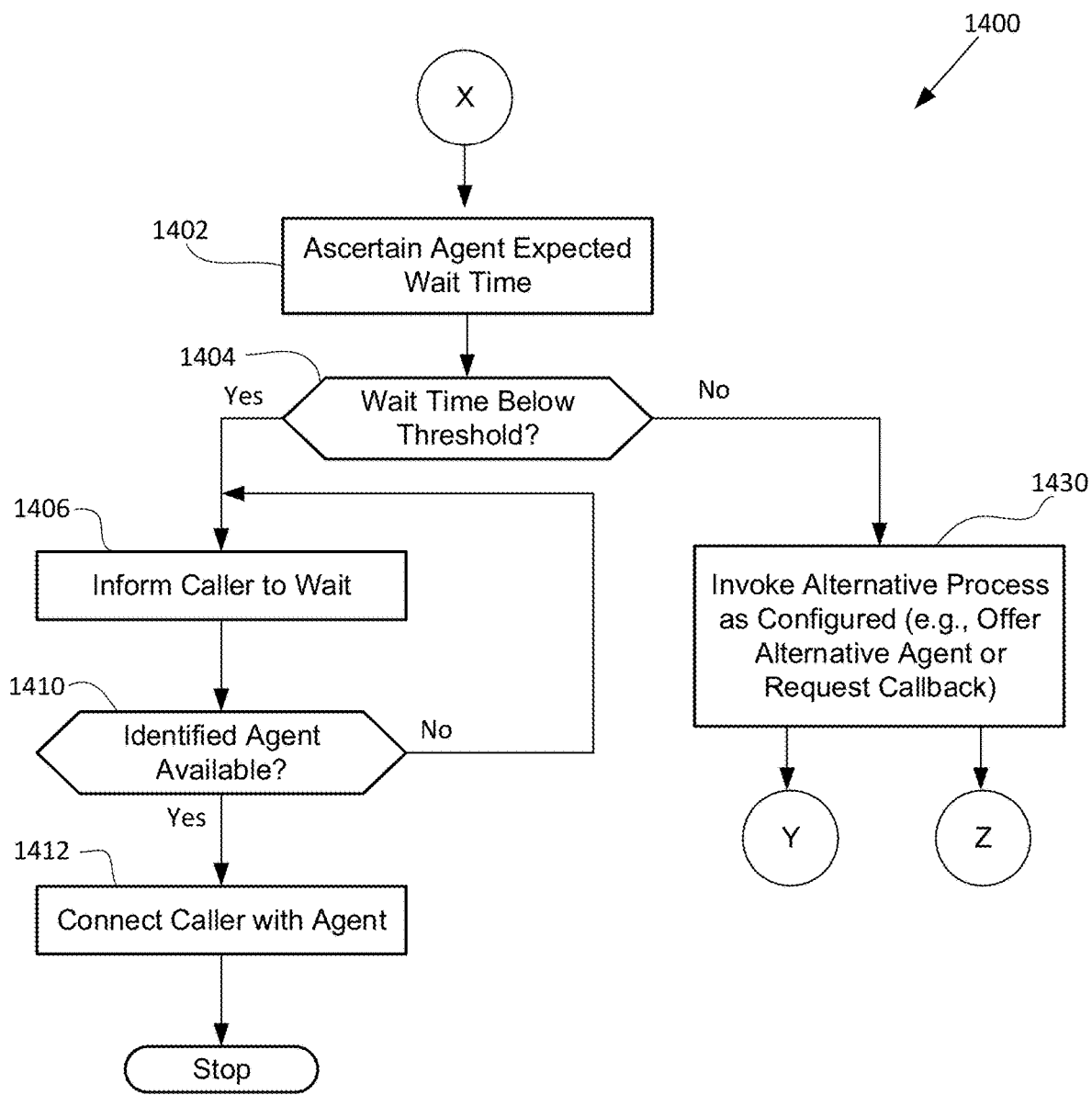

Turning to FIG. 13, the process 1300 illustrates a first, and frequently a preferred option of connecting the callback caller to the identified agent in the LC-text. The process begins with receiving a callback call in operation 1302. This is assumed to be a caller responding to a previously received LC-text. Upon receiving the call, the call handler determines for this caller, which are the identified agent or agents identified in the LC-text message. The LC-text message must identify at least one agent by name, but may include two (or more) identified agents. In some cases an alias may be used, so that identifying the name of the alias requires a further lookup of the actual agent associated with the alias. For the sake of illustration, it is assumed that the LC-text message may have one or two named agents.

After the call handler identifies the agents, a test is made to determine if any of the named agents are available in operation 1304. If any are presently available, the call handler may optionally reserve that agent so that an intervening call does not occupy the agent. If the primary agent, i.e., the first named agent in the LC-text message, is available in operation 1306, then the call is routed to that agent in operation 1308, and the process is completed. If the primary agent is unavailable in operation 1306, then the call is routed to the secondary agent if they are available, i.e., the second named agent in the LC-text message (and so forth, if there are more than two identified). Because the process ascertained an agent was available in operation 1304, that means if the primary agent is unavailable, then the secondary agent must be available (otherwise, the "no" branch from operation 1304 would have occurred). It is possible that there may be a third (or more) agent named in the LC-text message, and the process flow described can be expanded to handle three or more agents in a similar manner. Once the callback call is routed to the available agent, the processing is complete.

The availability of the agent may be tracked in the call handler by a table or other type of data structure which indicates for each agent, whether they are handling a voice call, are unavailable (i.e., engaged in after-call-work), or are available for receiving a call. The after-call-work state is a condition that may be defined after the call has ended, but during which the agent is not available to receive another incoming call because the agent must complete certain tasks after the call (hence, the term "after-call-work"). The agent availability table may track the state of each agent and is typically indexed by an agent identifier. Each agent may be assigned an agent identifier, which uniquely is associated with the agent's name and/or alias (if alias names are used). There may be a separate table defined for determining the agent identifier associated with an agent's name or alias. In other embodiments, the agent's name and/or alias could be incorporated into the agent availability table. The agent availability table can be accessed to ascertain whether the primary agent is available, and if not, then the availability of the second agent can be ascertained.

In many instances the identified agent(s) will be unavailable. In that case, the caller may be connected to an IVR or other unit and interacted with one of the operations shown as queuing the caller 1320, offering an alternative agent 1325, or soliciting a call back 1330. These operations are discussed further in FIGS. 14, 15, and 16 respectively.

Figure 18:
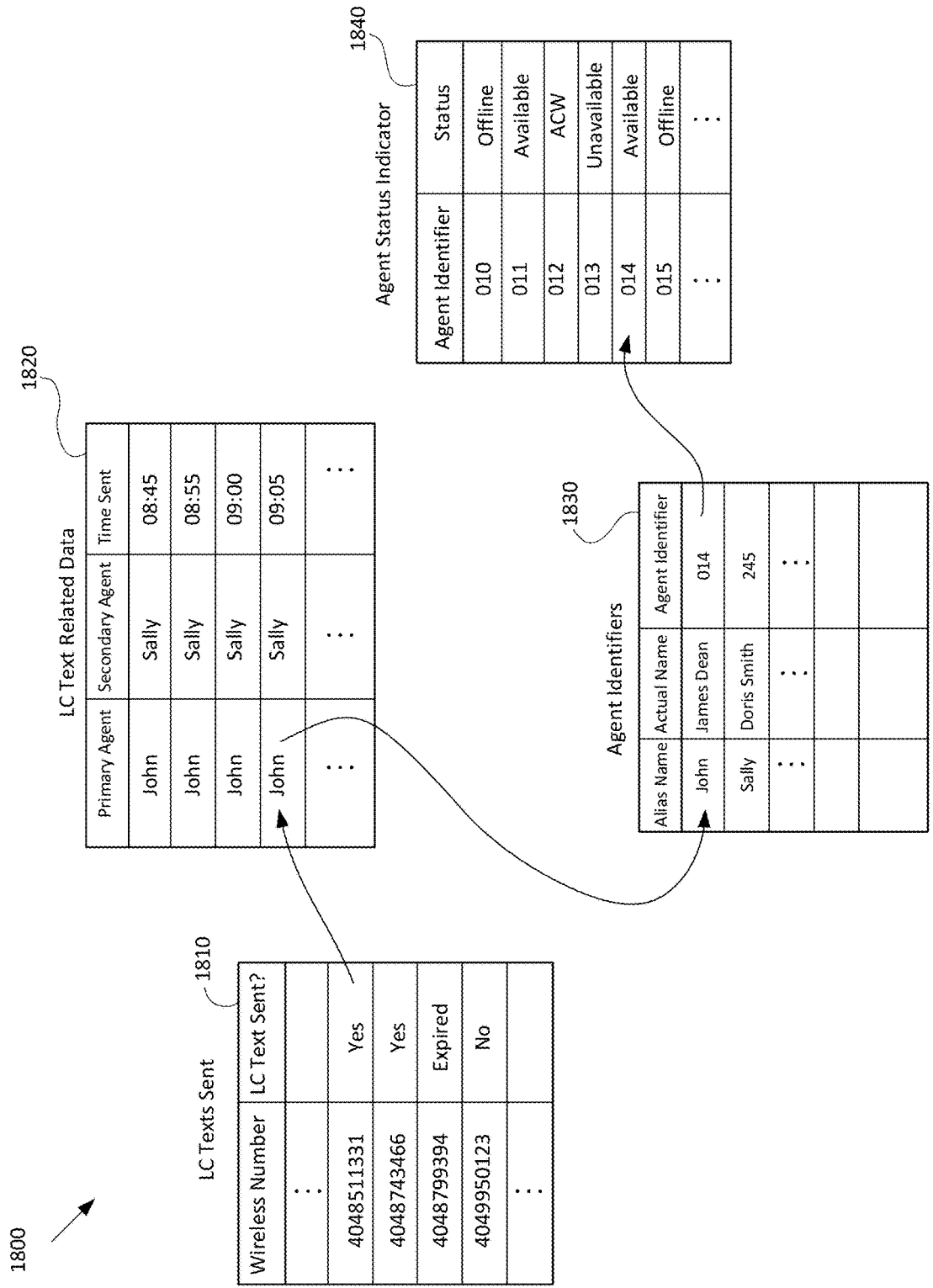
FIG. 18 illustrates one embodiment of various data structures that may be used in one embodiment associated with processing an incoming voice call responsive to a previously sent LC-text message.

One embodiment 1800 of various data structures that may be utilized for identifying the agent associated with an incoming call responding to a previously sent LC-text is shown in FIG. 18. Turning to FIG. 18, various data structures are shown in the form of tables, though other types of structures could be used. One table 1810 indicates for a given wireless number, whether an LC-text has been sent. This table is referred to as the LC-Texts Sent table 1810. Another table 1820, is the LC-Text Related Data table, which indicates information associated with a particular LC-text that as sent. Another table 1830 is an Agent Identifiers table which provides information about the names of agents and their agent identifiers. Finally, the Agent Status Indicator table 1840 provides information on the status of each agent. It should be evident to one skilled in the art that the structure, organization, and linkage of these tables can be varied to accomplish the same purpose and operation disclosed herein. That being said, this is just one embodiment, and some of the variations that are possible are detailed below in conjunction with describing how they may be used.

Turning to the LC-Texts Sent table 1810, this provides information for a wireless number whether a LC-Text has been sent. The wireless numbers are organized in ascending order to facilitate using the wireless number as an index. Thus, upon receiving an incoming voice call, the call handler could consult this table to ascertain whether a previous LC-text was sent to that number. This informs the call handler that it is likely that the incoming voice call is a result of the party responding to having received the LC-Text. In this embodiment, each wireless number is associated with information as to whether an LC-Text was sent or not. The "expired" indicator reflects that a LC-text was sent previously, but it was a while ago, so that the incoming call may or may not be the result of the party responding to the LC-Text. This value may not be used in all embodiments. Further, in other embodiments, only the wireless numbers for which this is a recent LC-Text sent could be included. Thus, in that case, the presence of the wireless number in the table indicated that there was a recent LC-Text sent out. The time duration for what constitutes "recent" can be set by a timer. For example, text sent out within the last 24 hours could be indicated as a "yes", texts which were sent out more than 24-48 hours could be listed as "expired", and texts sent out more than 48 hours could be reset to "no." In various embodiments, as LC-Texts as sent out, the wireless number may be added to this table. Other embodiments may include a timestamp so that if no responses are received, the indicators could be reset.

In this embodiment, the table 1810 functions to not only indicate that a previous (recent) LC-Text was sent out to that wireless number, but also provide a pointer to a particular record in the LC-Text-Related Data Table 1820. This table 1820 contains information related to the particular LC-Text sent out. In this embodiment, the names of the primary and secondary agents are indicated, along with the time sent out. In this embodiment, the alias names are used, and both a primary and secondary agent are indicated, because both were indicated in the LC-Text. In other examples, only a single primary agent may be indicated, and an alias may not be used, but rather the agents real name.

In this embodiment, the wireless number 4048511331 did have a recent LC-text sent out based on table 1810, and it points to the fourth record in the LC-Text Related Data table 1820, which indicates that the LC-text was sent referencing "John" as the primary agent, "Sally" as the secondary agent, and the time sent as "09:05". In other embodiments, these two tables could be collapsed into one. Further, other information, such as the text of the LC-text actually sent could be maintained. Regardless of the implementation specifics, these structures allow the call handler to know that when an incoming call is received, whether the call is likely a response from a prior LC-text sent to the wireless number, and which agent(s) were referenced in the LC-text.

The call handler would then have to identify the agent based on the alias indicated in the LC-Text. In this case, the Agent Identifier table 1830 may be consulted. This table maintains the alias name, actual name, and the agent identifier (typically a numerical value). Thus, if it is known that "John" was the agent referenced in the original LC-text sent out, this table 1830 indicates that the alias of "John" corresponds to "James Dean" who is agent number "014." Now, the call handler knows that the primary agent the incoming call should be directed to is agent "014".

The next table referenced is the Agent Status Indicator table 1840. This indicates the availability status of each identified agent. In this embodiment, agents may be in various states, such as "offline", "available", "unavailable", or "ACW" (after-call-work). Not all embodiments will necessarily use all these states indicators, as more or less can be used. But, an indication must be provided as to whether the agent is able to handle a call or not. In this case, "offline" means that the agent has not logged-in, or is on break. The agent may not be scheduled to work that day, or has ended their shift. In any case, they would be considered as unavailable to receive a call. Another state is "after-call-work" which reflects that the agent has just completed a call, and though the agent is not presently handling a call, they are completing various tasks associated with the previously call. They too, are unavailable to handle a call. An "unavailable" indicator may reflect that the agent is on a call, and hence cannot handle another calls. In some embodiments, the "unavailable" may be used to also reflect the "offline" or "ACW" agent states. Finally, the "available" indicator reflects that the agent is able to receive and handle a call.

In this embodiment, the call handler knows upon receiving a call from a calling telephone number (404) 851-1331 that a wireless text was sent out, and it was sent out at 9:05 earlier, and it asked the called party to call back and speak to "John" or "Sally." Further, the call handler knows that "John" is actual the agent known as "James Dean" who is agent "014" and that agent "014" is available to handle a call. Thus, these data structures are one embodiments for providing a rapid means for the call handler to ascertain whether an incoming call is in response to a prior LC-text, and which agent that caller should be routed to. This is a much faster, more efficient, and flexible approach than having to search through the text of all previously sent LC-texts to ascertain whether the incoming call is responsive to an LC-text and identifying who it should be sent to. Furthermore, even searching the LC-text contents themselves would not be sufficient in allowing the caller to be routed to the appropriate agent, since the call handler may not know the appropriate mapping of the alias name to the actual agent.

Turning back to FIG. 14, this process 1400 represents queuing the caller for the identified agent. Essentially, once the identified agent (either the primary agent or one of the other identified agents) is ascertained as unavailable, the caller is queued and asked to wait. The process begins with operation 1402 where a determination is made for the expected wait time for the agent(s). If more than one agent was identified in the text message, then the expected wait time would be the shorter time of the agents identified. This can be determined by ascertaining an average holding time and evaluating how long the agent(s) has been on the current call. This allows a determination of how long the agent will be on the current call and thus how long the caller has to wait for the agent to become available. Of course, this calculation may also include 'after-call work' time, if there is any expected to occur on the current call. If the expected wait time is below a defined threshold in operation 1404, then the process proceeds to inform the caller to wait in operation 1406. This may include a generic announcement to the caller that the specific agent will be available shortly, or it may include an estimated wait time. If the identified agent is not readily available in operation 1410, the caller may be informed again of the expected wait time by returning to operation 1406. Once the identified agent is available in operation 1410, then the caller is connected to that agent in operation 1412. Upon connecting the call with the agent, the agent will be provided with the appropriate information as to the caller, including their name, account information, that the caller is a callback resulting from the sending of a LC-text, and potentially how long the caller has been waiting.

If the wait time is not below a threshold in operation 1404, then it means that the expected wait time may be too long to expect the caller to wait. If so, then the process proceeds to operation 1430 where one of the alternative processes may be invoked. This may include proceeding to process Y shown in FIG. 15 or process X shown in FIG. 16.

Figure 15:
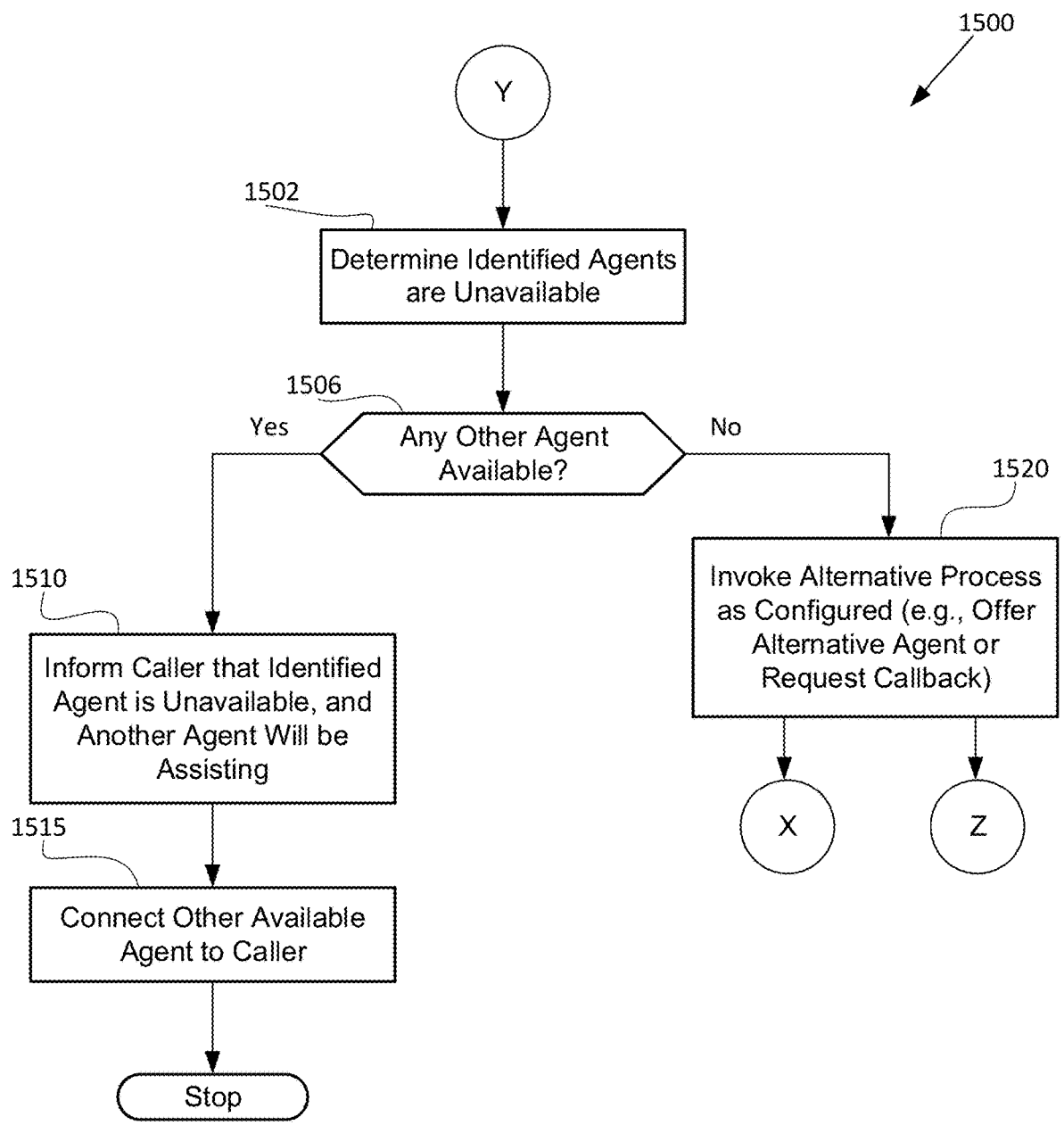

Turning to FIG. 15, which shows process Y 1500, the process again begins with determining that the identified agent(s) are unavailable in operation 1502. A determination is made whether there are any other agents are available at operation 1506. This may involve ascertaining whether the other agents have a necessary skill set. If there is another agent that is available to handle the call, the process proceeds to inform the caller that the identified agent is unavailable, but there is another agent that is available and may assist the caller in operation 1510. The caller is then connected to the agent in operation 1515. In various embodiments the caller may be informed and routed to the other agent, or may be prompted if another agent is acceptable to service their call. In such cases, the another agent upon receiving the callback call may be informed that the call is a callback call, and that the caller was intended to be routed to another agent that was unavailable. This informs the agent so that they are aware that the caller is not connected to the agent that they were expecting.

If there is no other agent available to handle the caller in operation 1506, then the process proceeds to invoke an alternative callback handling process in operation 1520. This may involve e.g., invoking process X in FIG. 14 or process Z in FIG. 16.

Figure 16:
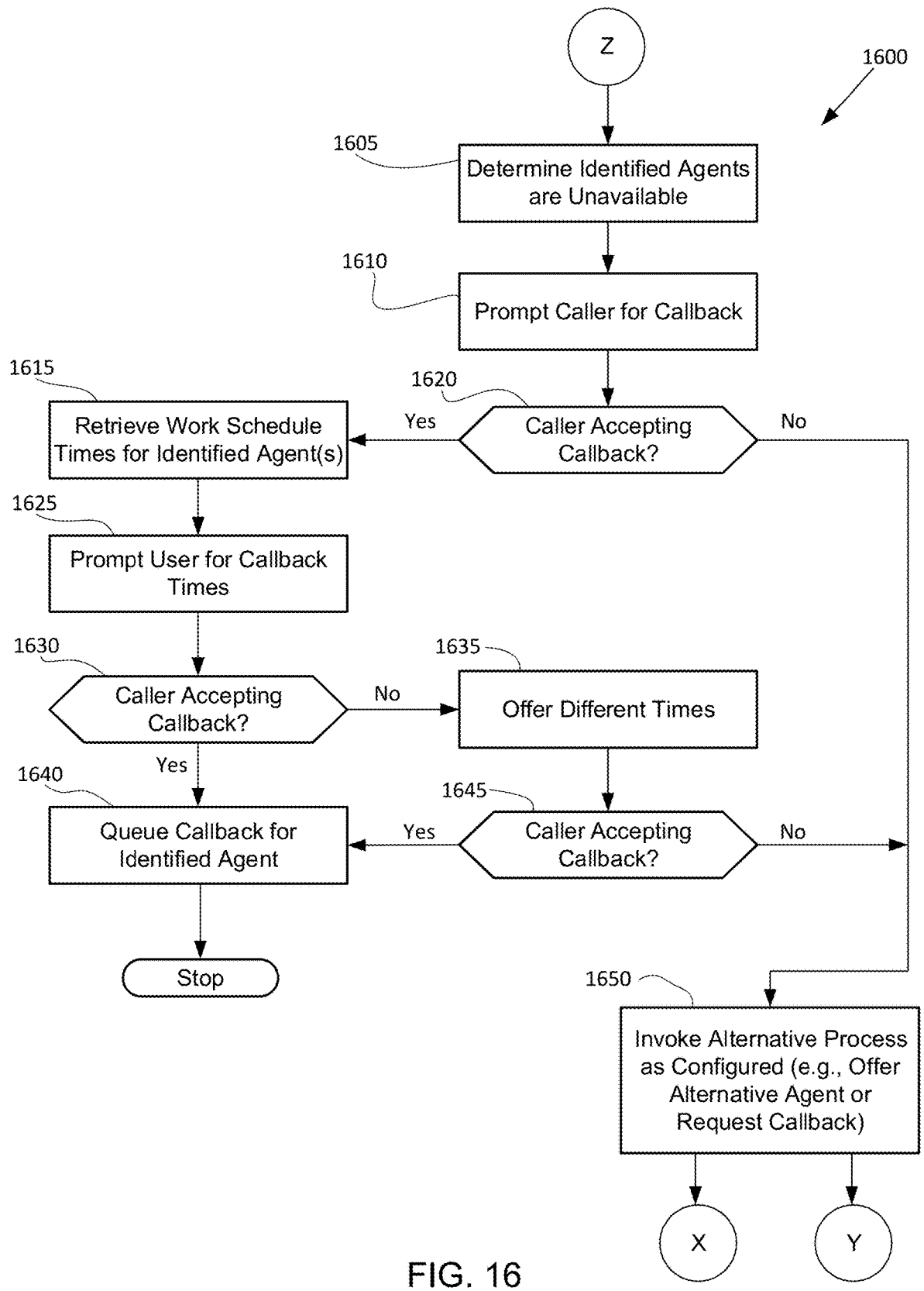

Turning to FIG. 16 which is process Z 1600, this presents an alternative processing flow for handling a callback caller. The process 1600 begins with determining the identified agent(s) are unavailable in operation 1605. The caller is then prompted for a callback in operation 1610. The callback request asks the caller whether a callback can be initiated to the caller when the named agent is available. If the caller accepts the callback in operation 1620, the work schedule for the identified agent(s) is retrieved to ensure that the callback will occur when the identified agent is working. This is necessary if the callback cannot occur during the agent(s) current shift. The caller is then prompted for the callback times in operation 1625. Various steps not shown may occur that involve a negotiation of a suitable callback time with the caller. If the caller accepts the available callback, then the callback is queued for the identified agent in operation 1640, and the call with the caller is disconnected. If the caller does not accept the indicated callback time in operation 1630, then the other times may be offered to the caller in operation 1635. If the caller accepts these, then the process proceeds to operation 1640. If the caller does not accept a callback in operation 1620 or 1645, then the process may invoke an alternative process for handling the caller in operation 1650. This may involve executing process X 1400 shown on FIG. 14 or process Y 1600 shown in FIG. 16.

It should be noted that not all implementations are limited to invoking the processes X 1400, process Y 1500, and/or process Z 1600. Some implementations may implement only one or two of process flows, or combine the process flows with minor variations as disclosed herein. The determination of which alternative process to invoke may be based on a variety of factors, including based on account characteristics of the caller. For example, the caller may be predicted as likely to call in later, if they cannot reach the indicated agent. In other cases, the caller may be deemed likely to default on an account if they do not reach an agent, so any another available agent may be offered to the caller. In other cases, the caller may be closely linked with the agent (i.e., the callers account is assigned to the agent) so that another available agent is never offered to the caller, and only a callback from that agent is offered.

In other variations, a caller may be queued for a first agent, but after a time period, the caller is then offered an alternative agent or provided with a callback to the first agent. In another variation, the caller may be asked to wait for a second agent, which has a lower expected wait time than a first agent. In both cases, the first and second agent may be identified in the limited-content text message to the caller. In another variation, a caller may be solicited for a callback by the identified agent, but upon declining, the caller is then prompted to wait for the identified agent.

Exemplary Processing Device Architecture

Figure 17:
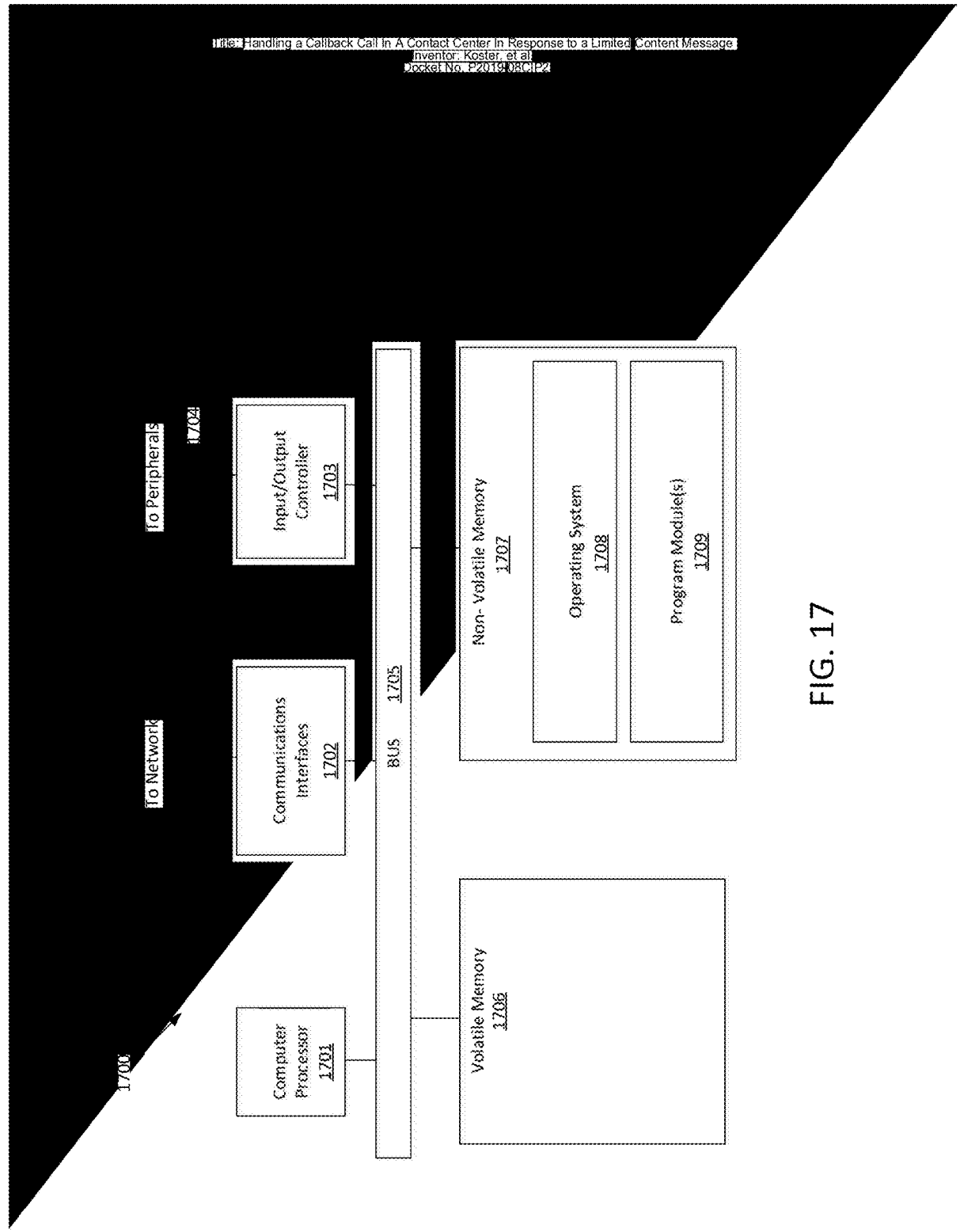
FIG. 17 illustrates one embodiment of a computer processing system that can be used to implement the concepts and technologies disclosed herein.

As discussed in conjunction with FIG. 1, the contact center architecture 100 may comprise various components. Accordingly, FIG. 17 is an exemplary schematic diagram 1700 of a computer processing component 1701 that may be used in various embodiments of the contact center architecture 100 to practice the technologies disclosed herein. In general, the term "computer processing component" may be exemplified by, for example, but without limitation: a various types of computers, servers, blades, gateways, switches, and the like, as well as any combination of devices or entities adapted to perform the functions described herein.

As shown in FIG. 17, the computer processing system 1700 may include one or more computer processors 1701 that may communicate with other elements within the computer processing component 1701 via a bus 1705. The computer processor 1701 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the computer processing component 1700 may also include one or more communication interfaces 1702 for communicating data via the local network with various external devices, such as other components of FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The computer processing component 1700 may further include an input/output controller 1703 that may communicate with one or more input devices or peripherals using an interface 1704, such as, but not limited to: a keyboard, a mouse, a touch screen/display input, microphone, pointing device, etc. The input/output controller 1703 may also communicate with output devices or peripherals, such as displays, printers, speakers, headsets, banner displays, etc.

Although the computer processor may be a generic computing system, the instructions executed on the computer processor consistent with the concepts disclosed herein are unique from the capabilities found in a generic computer system. The computer processor 1701 may be configured to execute instructions stored in volatile memory 1706, non-volatile memory 1707, or other forms of computer-readable storage media accessible to the computer processor 1701. The volatile memory 1706 may comprise various types of memory technologies, including, but not limited to: random access memory ("RAM"), dynamic random access memory ("DRAM"), static random access memory ("SRAM"), and other forms well known to those skilled in the art. The non-volatile memory 1707 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1707 may store program code and data, which also may be loaded into the volatile memory 1706 at execution time. Specifically, the non-volatile memory 1707 may store one or more program modules 1709, containing instructions for performing the processes and/or functions associated with the technologies disclosed herein, and/or operating system code 1708. In addition, these program modules 1709 may also access, generate, or store data, in the non-volatile memory 1707, as well as in the volatile memory 1706. The volatile memory 1706 and/or non-volatile memory 1707 may be used to store other information including, but not limited to: records, applications, programs, scripts, source code, object code, byte code, compiled code, interpreted code, machine code, executable instructions, or the like. These may be executed or processed by, for example, the computer processor 1701 and/or may form a part of, or may interact with, the program modules 1709.

The technologies described herein may be implemented in various ways, including as computer program products comprising memory storing instructions causing a computer processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. It is not necessarily to detail all the various embodiments that can utilized the concepts and technologies disclosed herein. For example, the callback call could be first handled by an IVR that provides information to the caller, and then the call is handled by a communication handlers that then routes to the call to the appropriate agent. Or, the call could be first handled by the communications handler, which provides the announcement and then routes the call to the agent. Or, the IVR could be integrated into the communications handler. Thus, there are a myriad of variations that could be implemented by one skilled in the art in light of the foregoing disclosure. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system including a call handler in a contact center, the call handler comprising at least one computer processor and a memory storing instructions that when executed case the at least one computer processor to:

determine a primary agent and secondary agent are scheduled to work on a given day in the contact center by accessing a schedule of agents working in the contact center, wherein the schedule of agents is created by a workforce management system;

compose a limited-content text ("LC-text") message after ascertaining the primary agent and the secondary agent are scheduled to work, wherein the LC-text message comprises a first name corresponding to the primary agent and a second name corresponding to the secondary agent;

cause the limited-content text message to be sent to a destination address comprising a wireless number on the given day;

receive the incoming voice call on the given day in the contact center wherein a calling party number of the incoming voice call is the wireless number;

upon receiving the incoming voice call, determine the calling party number in the incoming voice call corresponds to the wireless number corresponding to the destination address of the LC-text message sent earlier during the given day;

determine a first identity of the primary agent and a second identity the secondary agent indicated in the LC-text message;

use the first identity of the primary agent to determine the primary agent is unavailable to receive the incoming voice call;

use the second identity of the secondary agent to determine the secondary agent is available to receive the incoming voice call; and route the incoming voice call to the secondary agent after determining the secondary agent is available.

2. The system of claim 1, wherein the first name and the second name are alias names corresponding respectively to the primary agent and the secondary agent, and wherein the computer processor is further configured to:

use the first name and the second name to determine a first agent identifier and a second agent identifier corresponding to the primary agent and the secondary agent;

determine the primary agent is unavailable by accessing an agent availability table indexed by the first agent identifier; and determine the secondary agent is available by accessing the table indexed by the second agent identifier.

3. The system of claim 1, wherein the computer processor is further configured to:

retrieve the schedule generated by the workforce management system to ascertain the first name and the second name corresponding respectively to the primary agent and the secondary agent prior to sending the LC-text message.

4. The system of claim 1, wherein the computer processor is further configured to:

send a plurality of LC-text messages to a plurality of wireless numbers including sending the LC-text message to the destination address comprising the wireless number, wherein each of the plurality LC-text messages indicates the first name and the second name.

5. The system of claim 1, wherein the computer processor is further configured to:

generate a defined schedule for when to send the LC-text message to the wireless number during the given day.

6. The system of claim 1, wherein the computer processor is further configured to:

display on a computer monitor used by the secondary agent information indicating the incoming voice call correlates to the previously sent LC-text message.

7. A method for processing an incoming voice call to an agent working in a contact center using a communications handler comprising a computer processor, the method comprising:
determining by the computer processor a primary agent and secondary agent are scheduled to work on a given day in the contact center by accessing a schedule of agents working in the contact center, wherein the schedule of agents is created by a workforce management system;
composing a limited-content text ("LC-text") message after ascertaining the primary agent and the secondary agent are scheduled to work, wherein the LC-text message comprises a first name corresponding to the primary agent and a second name corresponding to the secondary agent;
causing the limited-content text message to be sent to a destination address comprising a wireless number on the given day;
receiving the incoming voice call on the given day at the communications handler in the contact center wherein a calling party number of the incoming voice call is the wireless number;
upon receiving the incoming voice call, determining by the communications handler that the calling party number in the incoming voice call corresponds to the wireless number corresponding to the destination address of the LC-text message sent earlier during the given day;
determining by the communications handler a first identity of the primary agent and a second identify of the secondary agent indicated in the LC-text message;
using the first identity of the primary agent by the communications handler to determine the primary agent is unavailable to receive the incoming voice call;
using the second identity of the secondary agent by the communications handler to determine the secondary agent is available to receive the incoming voice call; and
routing the incoming voice call by the communications handler to the secondary agent after determining the secondary agent is available.

8. The method of claim 7, wherein the first name and the second name are alias names corresponding respectively to the primary agent and the secondary agent, and wherein the computer processor is further configured to:
use the first name and the second name to determine a first agent identifier and a second agent identifier corresponding to the primary agent and the secondary agent;
determine the primary agent is unavailable by accessing an agent availability table indexed by the first agent identifier; and
determine the secondary agent is available by accessing the table indexed by the second agent identifier.

9. The method of claim 7, further comprising:
retrieving the schedule generated by the workforce management system to ascertain the first name and the second name corresponding respectively to the primary agent and the secondary agent prior to sending the LC-text message.

10. The method of claim 7, wherein the step of causing the limited-content text message to be sent to a destination address comprising a wireless number on the given day comprises:
sending a plurality of LC-text messages to a plurality of wireless numbers, wherein each of the plurality LC-text messages indicates the first name and the second name.

11. The method of claim 10, further comprising:
generating a defined schedule for when to send the LC-text message to the wireless number during the given day.

12. The method of claim 7, further comprising
displaying on a computer monitor used by the secondary agent information indicating the incoming voice call correlates to the previously sent LC-text message.

13. A non-transitory computer readable medium storing instructions that when executed cause a computer processor in a communications handler in a contact center to:
determine a primary agent and secondary agent are scheduled to work on a given day in the contact center by accessing a schedule of agents working in the contact center, wherein the schedule of agents working is created by a workforce management system;
compose a limited-content text ("LC-text") message after ascertaining the primary agent and the secondary agent are scheduled to work, wherein the LC-text message comprises a first name corresponding to the primary agent and a second name corresponding to the secondary agent;
cause the limited-content text message to be sent to a destination address comprising a wireless number on the given day;
receive the incoming voice call on the given day in the contact center wherein a calling party number of the incoming voice call is the wireless number;
upon receiving the incoming voice call, determine the calling party number in the incoming voice call corresponds to the wireless number corresponding to the destination address of the LC-text message sent earlier during the given day;
determine a first identity of the primary agent and a second identity of the secondary agent indicated in the LC-text message;
use the first identity of the primary agent to determine the primary agent is unavailable to receive the incoming voice call;
use the second identity of the secondary agent to determine the secondary agent is available to receive the incoming voice call; and
route the incoming voice call to the secondary agent after determining the secondary agent is available.

14. The non-transitory computer readable medium of claim 13, wherein the first name and the second name are alias names corresponding respectively to the primary agent and the secondary agent, and wherein the instructions when executed further cause the computer processor to:
use the first name and the second name to determine a first agent identifier and a second agent identifier corresponding to the primary agent and the secondary agent;
determine the primary agent is unavailable by accessing an agent availability table indexed by the first agent identifier; and
determine the secondary agent is available by accessing the agent availability table indexed by the second agent identifier.

15. The non-transitory computer readable medium of claim 13, wherein the instructions when executed further cause the computer processor to:
retrieve the schedule generated by the workforce management system to ascertain the first name and the second name corresponding respectively to the primary agent and the secondary agent prior to sending the LC-text message.

16. The non-transitory computer readable medium of claim 13, wherein the instructions when executed further cause the computer processor to:

send a plurality of LC-text messages to a plurality of wireless numbers including sending the LC-text message to the destination address comprising the wireless number, wherein each of the plurality LC-text messages indicates the first name and the second name.

17. The non-transitory computer readable medium of claim 13, wherein the instructions when executed further cause the computer processor to:

generate a defined schedule for when to send the LC-text message to the wireless number during the given day.

18. The non-transitory computer readable medium of claim 13, wherein the instructions when executed further cause the computer processor to:

display on a computer monitor used by the secondary agent information indicating the incoming voice call correlates to the previously sent LC-text message.

19. The non-transitory computer readable medium of claim 13, wherein the instructions when executed further cause the computer processor to:

retrieve an agent status table comprising the status of a plurality of agents, including the primary agent, to determine the primary agent is unavailable to receive the incoming voice call.

20. The non-transitory computer readable medium of claim 19, wherein the instructions when executed further cause the computer processor to:

use the wireless number to search a first data structure to determine the LC-text message was sent to the wireless number; and search a second data structure to determine the first name of the primary agent and the second name of the secondary agent identified in the LC-text message sent to the wireless number.

* * * * *